United States Patent
Huang et al.

(10) Patent No.: US 10,169,552 B2
(45) Date of Patent: Jan. 1, 2019

(54) EVENT-DRIVEN GENERATION OF WATERMARKED PREVIEWS OF AN OBJECT IN A COLLABORATION ENVIRONMENT

(71) Applicant: Box, Inc., Los Altos, CA (US)

(72) Inventors: Winston Yih-Jiun Huang, Sunnyvale, CA (US); Bryan Huh, San Jose, CA (US); Pierre-Alexandre Masse, Redwood City, CA (US); Justin Tim Peng, Mountain View, CA (US); Victor De Vansa Vikramaratne, Mountain View, CA (US); Jeremy Glassenberg, San Francisco, CA (US); Florian Jourda, San Francisco, CA (US); Hieu Minh Nguyen, Redwood City, CA (US)

(73) Assignee: Box, Inc., Redwood City, CA (US)

( * ) Notice: Subject to any disclaimer, the term of this patent is extended or adjusted under 35 U.S.C. 154(b) by 32 days.

(21) Appl. No.: 14/802,950

(22) Filed: Jul. 17, 2015

(65) Prior Publication Data
US 2017/0017779 A1    Jan. 19, 2017

(51) Int. Cl.
*G06F 21/16*    (2013.01)
*G06F 17/24*    (2006.01)
(Continued)

(52) U.S. Cl.
CPC ............ *G06F 21/16* (2013.01); *G06F 17/212* (2013.01); *G06F 17/2288* (2013.01);
(Continued)

(58) Field of Classification Search
CPC ........................................................ G06F 21/16
(Continued)

(56) References Cited

U.S. PATENT DOCUMENTS

| | | | | |
|---|---|---|---|---|
| 7,046,808 B1* | 5/2006 | Metois | .................. | G06T 1/0028 380/252 |
| 2002/0176116 A1* | 11/2002 | Rhoads | ................. | G06F 21/608 358/405 |

(Continued)

OTHER PUBLICATIONS

"About Digital Watermarking" http://digimarc.com/technology/about-digital-watermarking Accessed on Jun. 22, 2015.

*Primary Examiner* — William S Powers
(74) *Attorney, Agent, or Firm* — Vista IP Law Group, LLP

(57) ABSTRACT

Systems for dynamic watermarking within a cloud-based collaboration environment. Storage facilities are managed by servers to provide cloud-based storage services to two or more client entities as a service across a network. The servers maintain versions of editable documents or photo images or video clips using a version indication. Dynamic watermarking applies a first watermark image to a first version of the editable document and grants edit access to a first client entity of the two or more client entities. While the first client entity has edit access to the first version of the editable document the system generates a second version of the editable document and applies a second watermark image to the second version of the editable document before delivering the second version to a second client entity. A security watermark is based on a user credential, and a leak source can be determined based the user credential.

30 Claims, 18 Drawing Sheets

(51) Int. Cl.
*G06F 17/22* (2006.01)
*G06F 17/21* (2006.01)
*H04L 29/08* (2006.01)

(52) U.S. Cl.
CPC ............ *G06F 17/24* (2013.01); *G06F 17/241* (2013.01); *H04L 67/10* (2013.01)

(58) Field of Classification Search
USPC .......................................................... 726/29
See application file for complete search history.

(56) References Cited

U.S. PATENT DOCUMENTS

| | | | |
|---|---|---|---|
| 2007/0053549 A1* | 3/2007 | Miller ............... | G06F 17/30876 382/100 |
| 2008/0037825 A1* | 2/2008 | Lofgren ............ | G06F 17/30241 382/100 |
| 2011/0046983 A1* | 2/2011 | Soble .................... | G06F 19/322 705/3 |
| 2015/0163206 A1* | 6/2015 | McCarthy ........... | G06F 21/6227 713/171 |

\* cited by examiner

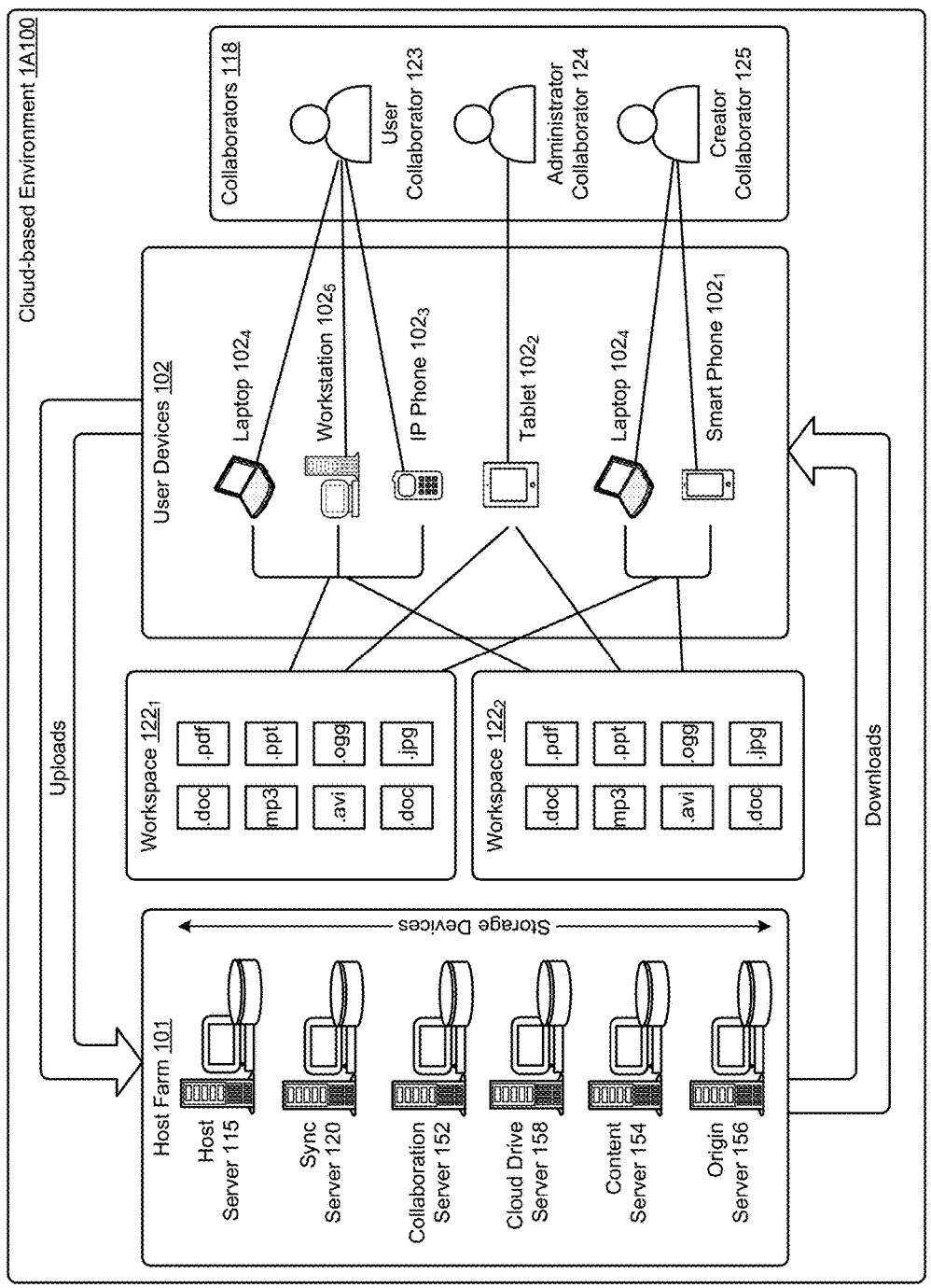
FIG. 1A1

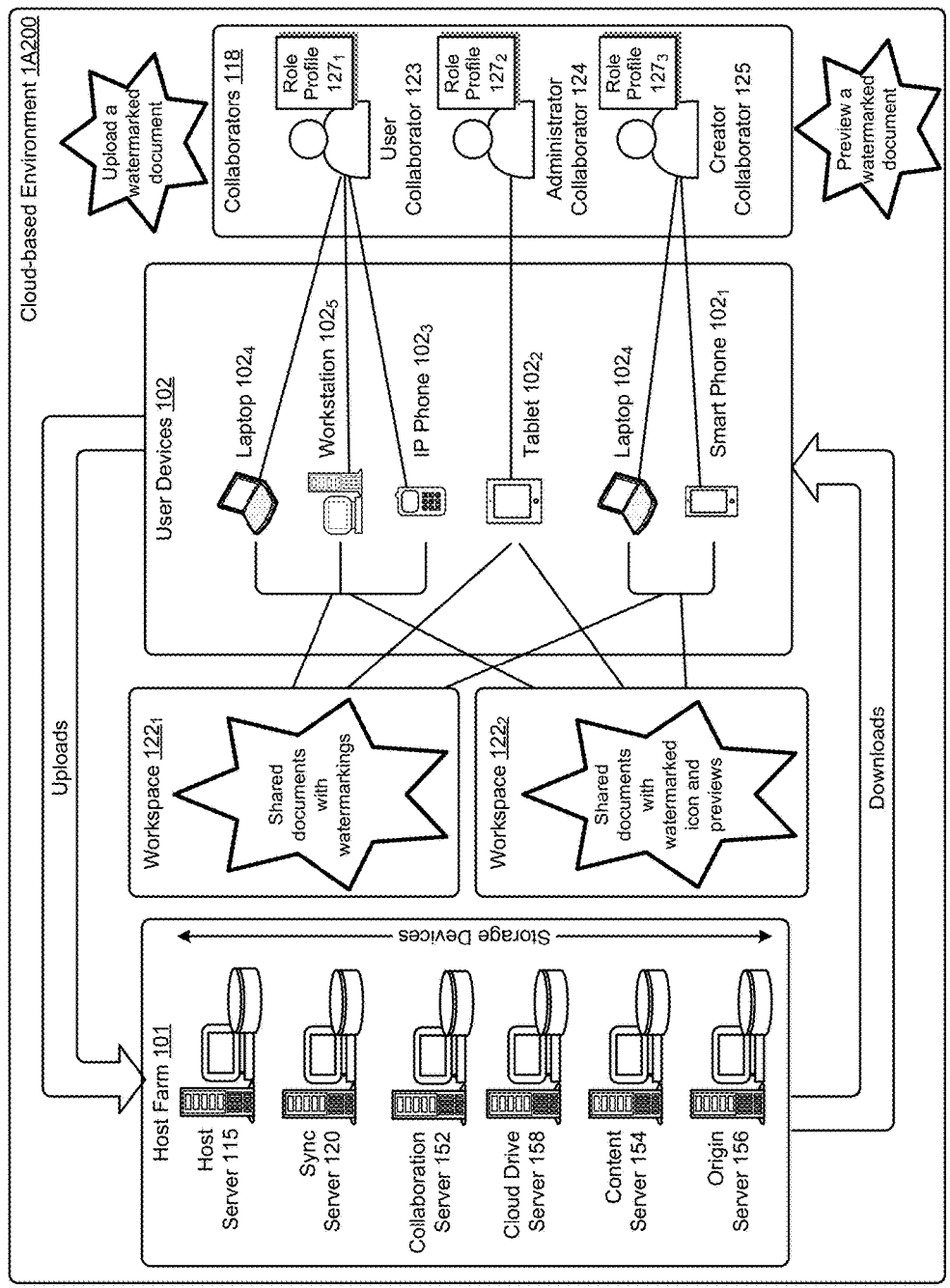
FIG. 1A2

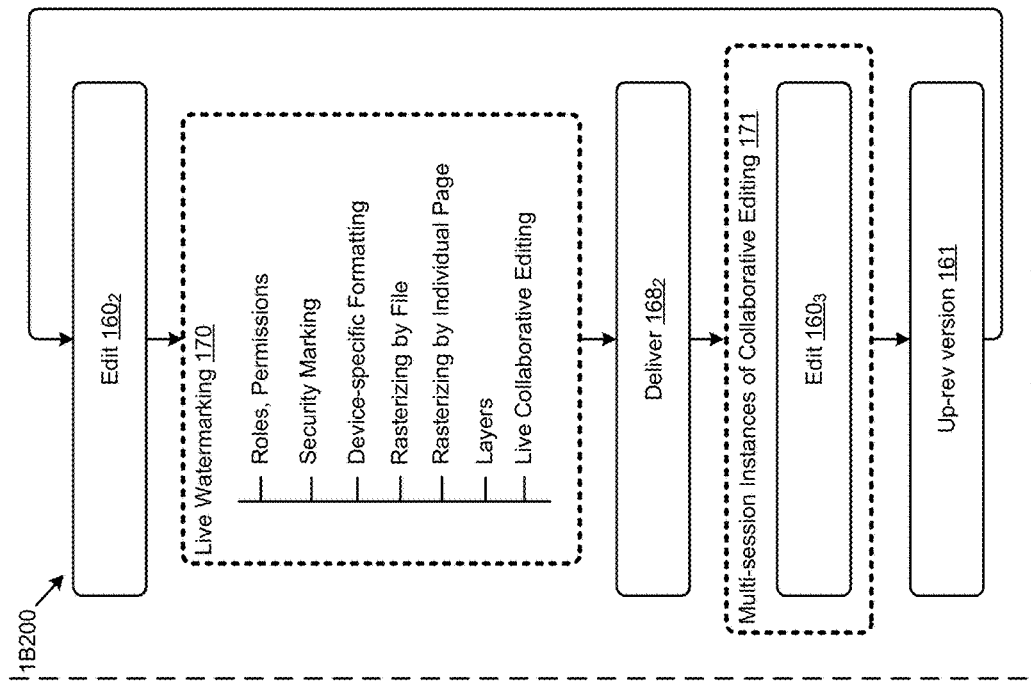
FIG. 1B2
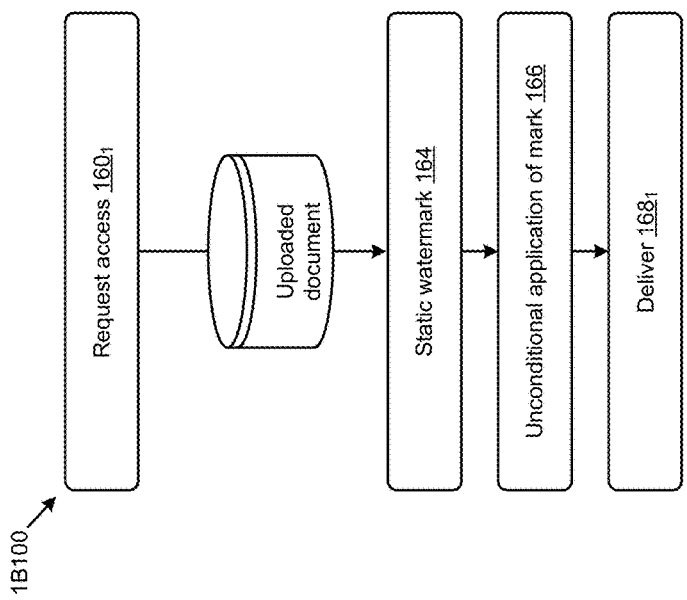
FIG. 1B1

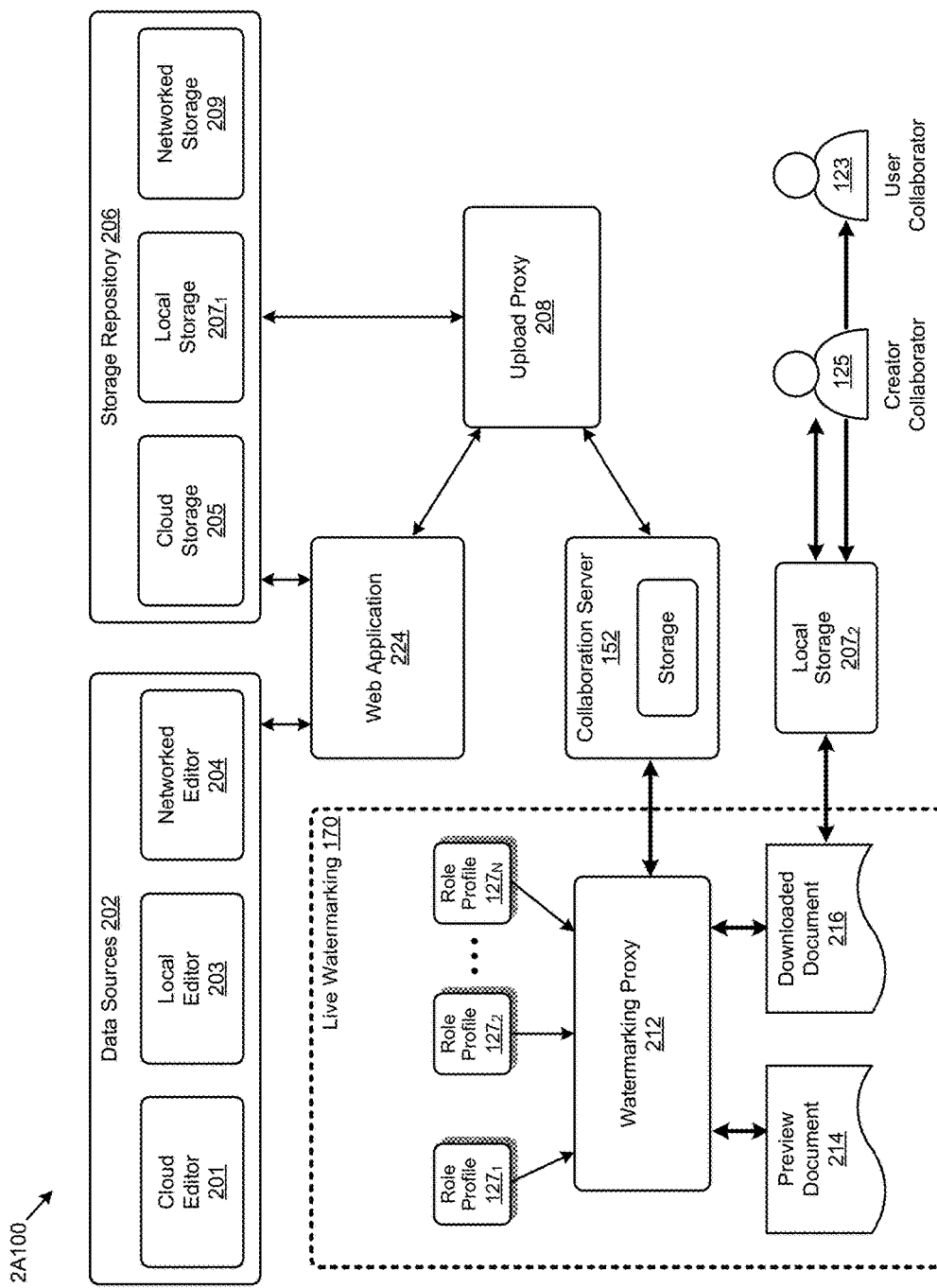
FIG. 2A1

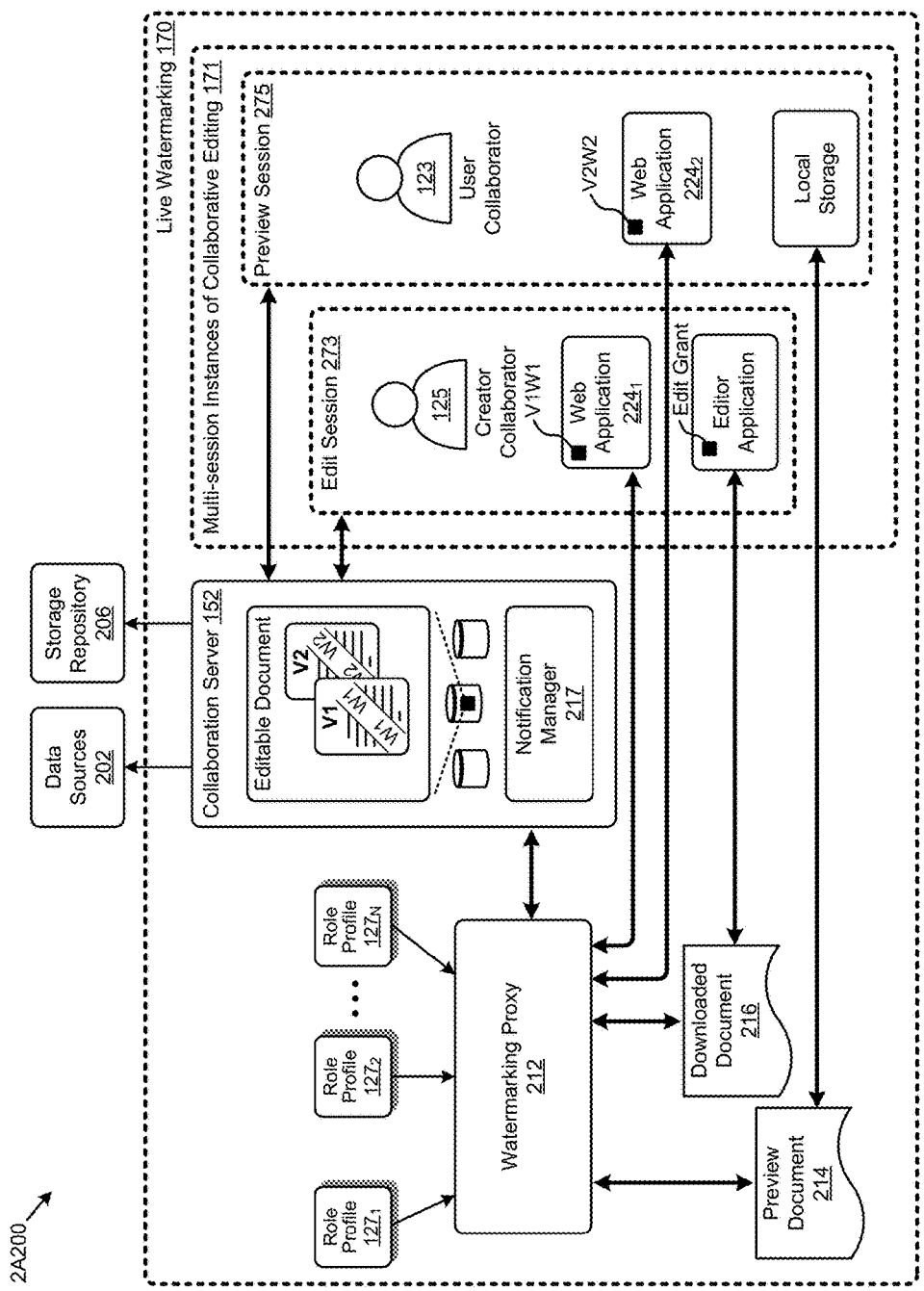
FIG. 2A2

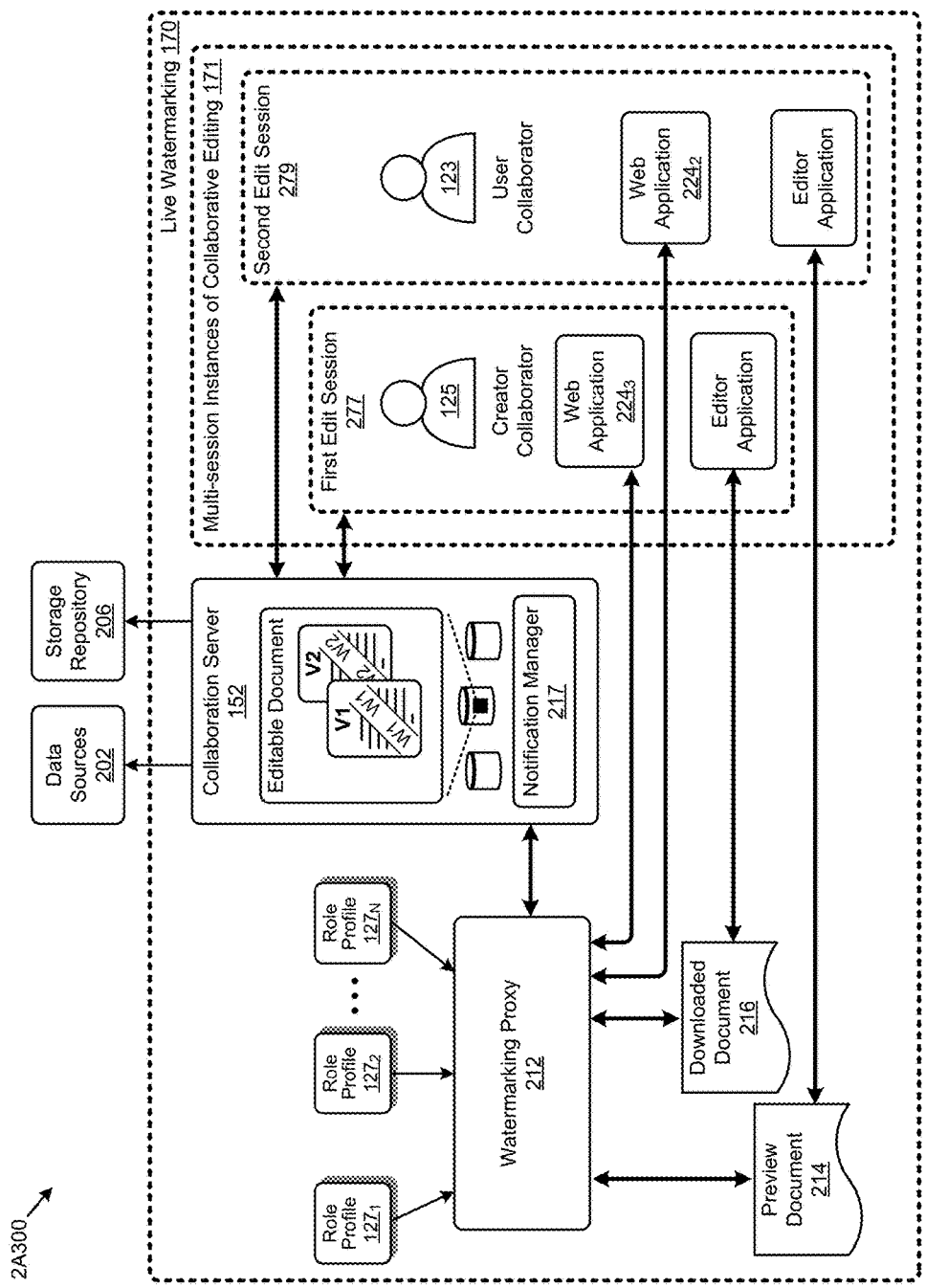
FIG. 2A3

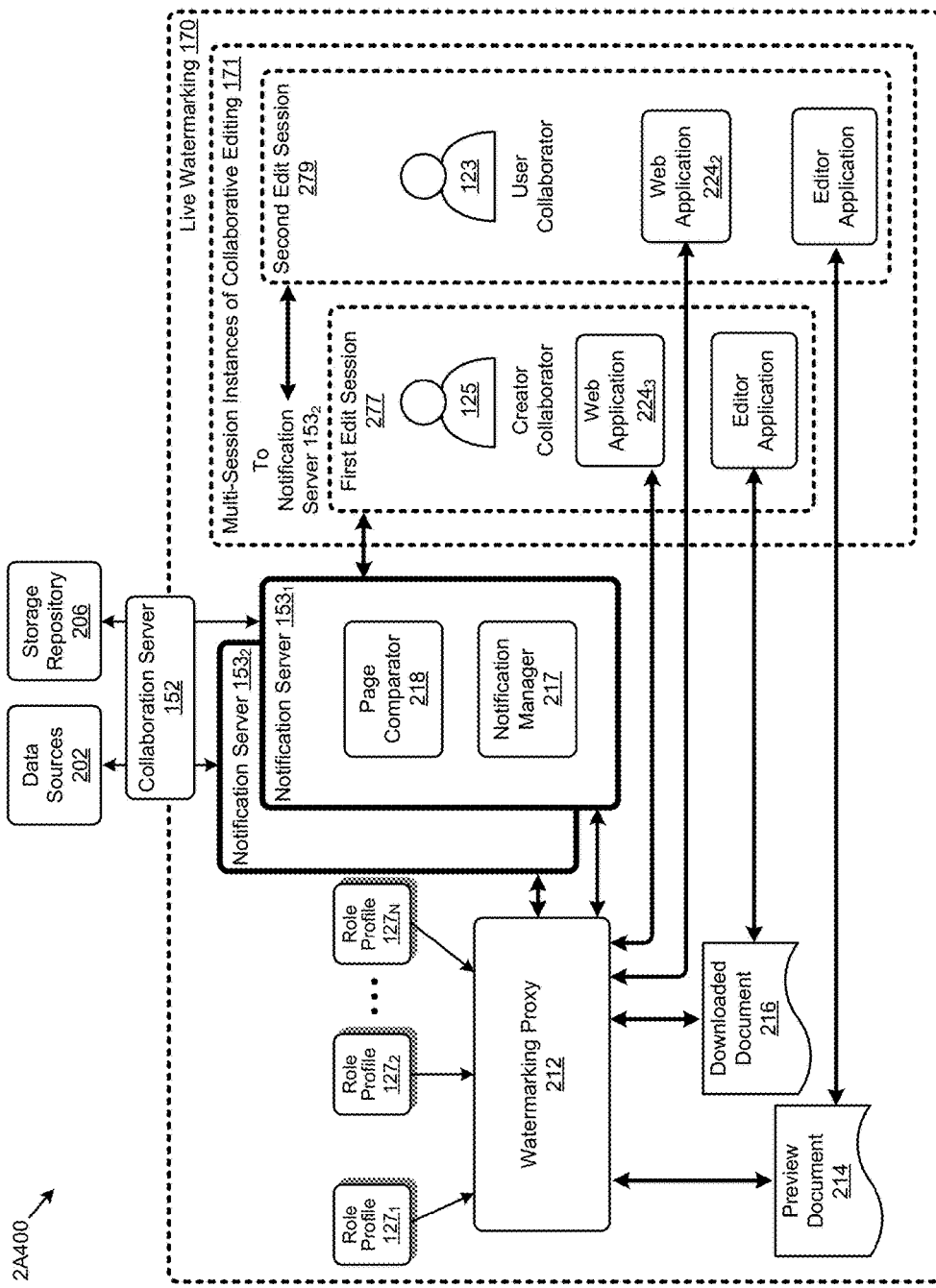
FIG. 2A4

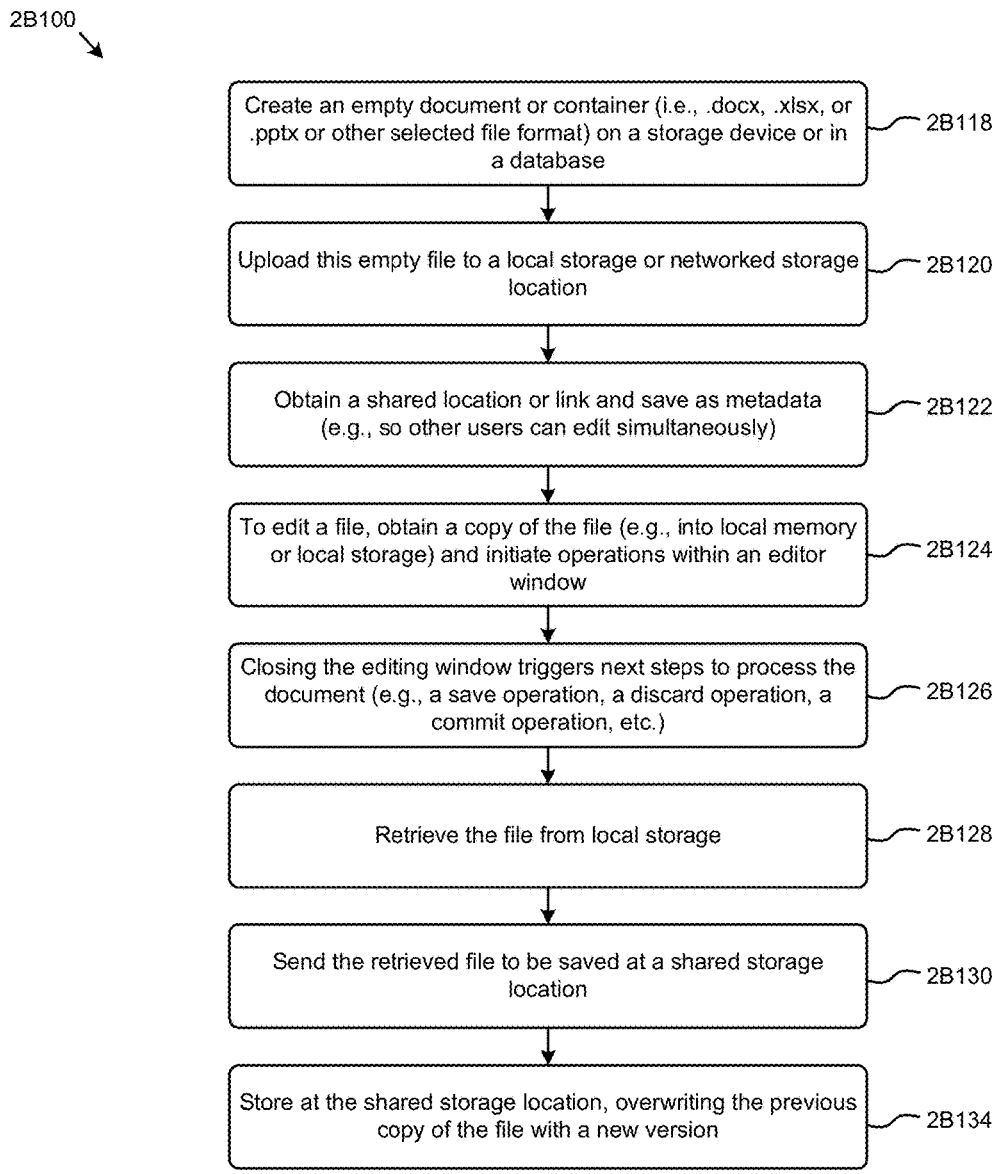
FIG. 2B1

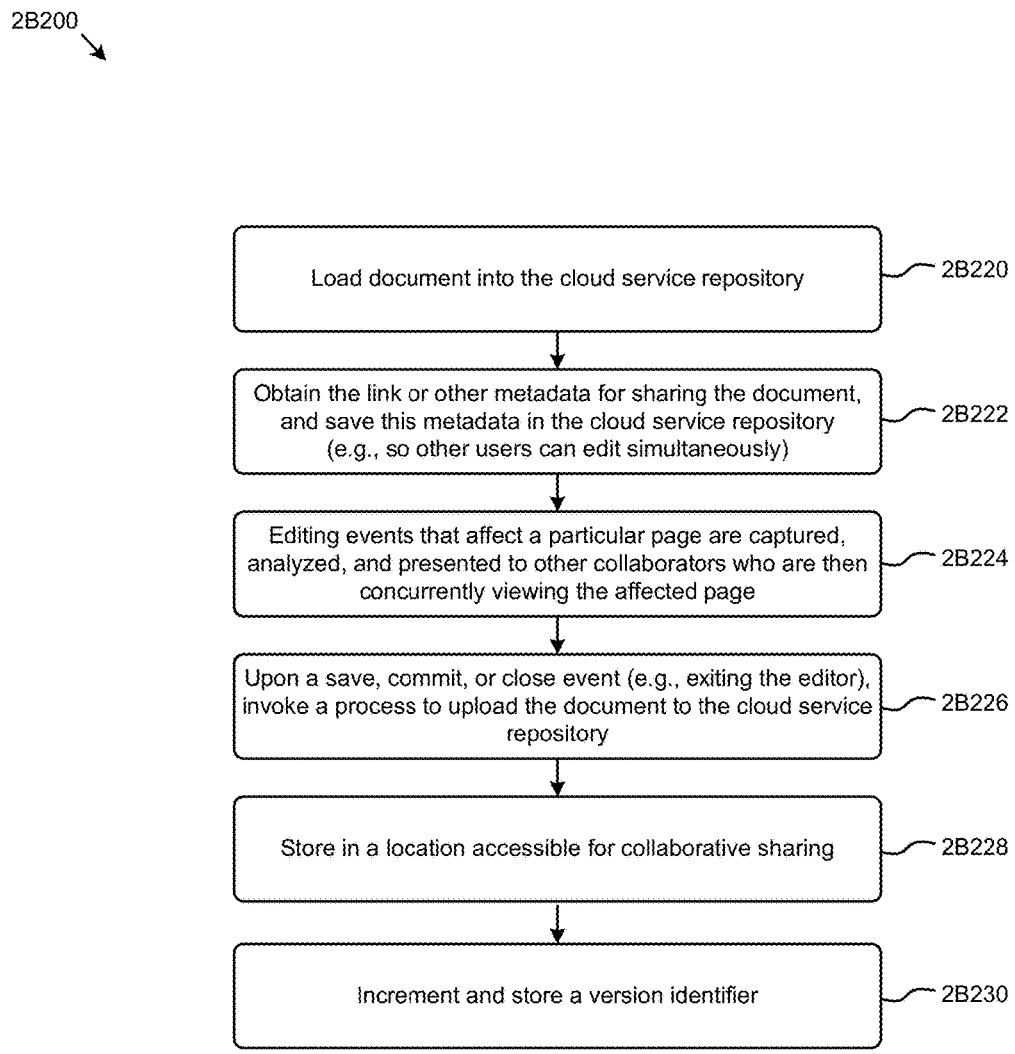
FIG. 2B2

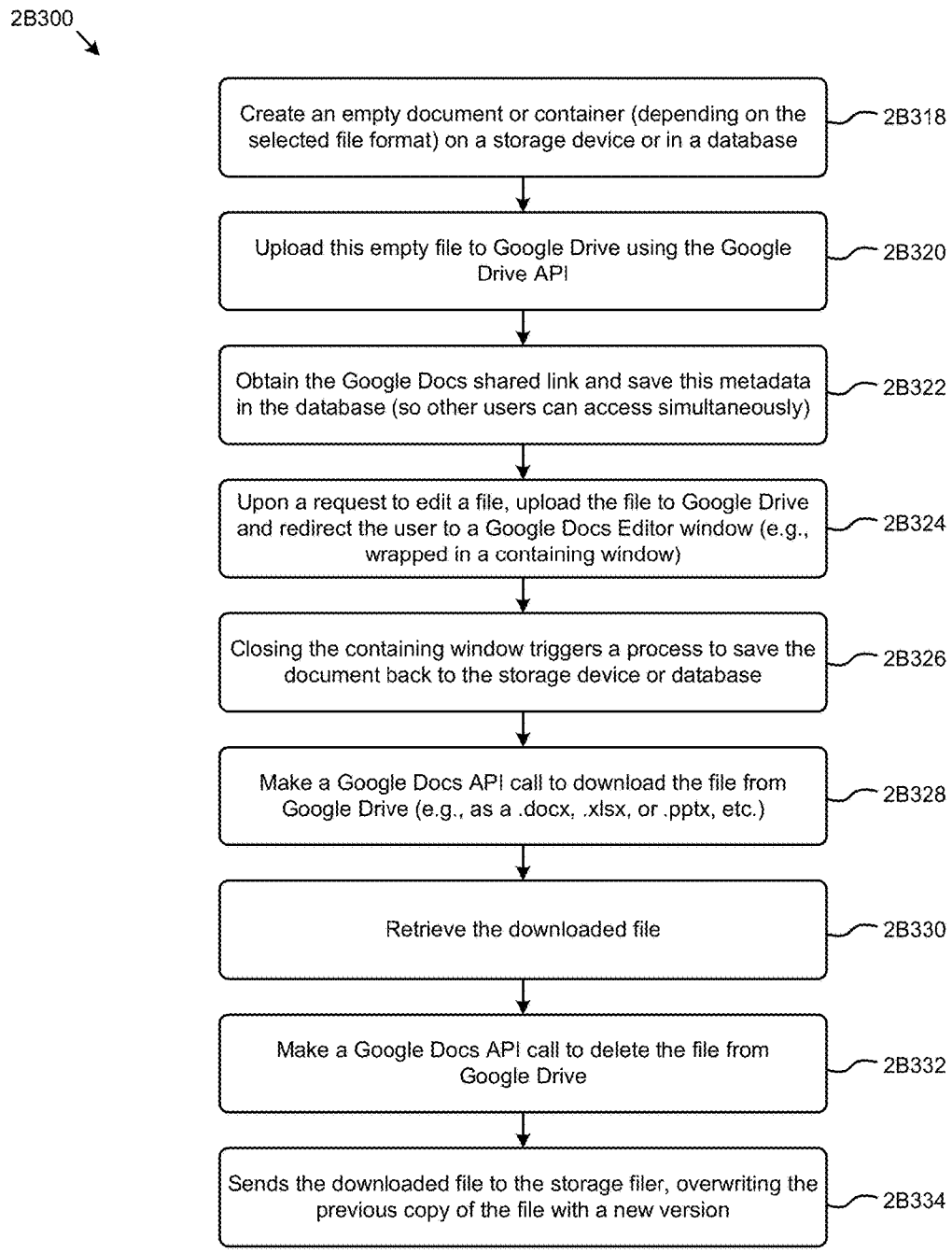
FIG. 2B3

300

| Access Role | Preview | Download/Make Available Offline | Sync | Print | API |
|---|---|---|---|---|---|
| Owner | Both (option) | Both (option) | Original | Both (option) | Both (option) |
| Co-owner | Both (option) | Both (option) | Original | Both (option) | Both (option) |
| Editor | Both (option) | Both (option) | Original | Both (option) | Both (option) |
| Viewer-Uploader | Both (option) | Both (option) | N/A | Both (option) | Both (option) |
| Previewer-Uploader | Watermarked | Watermarked | N/A | Watermarked | N/A |
| Viewer | Watermarked | Watermarked | N/A | Watermarked | Watermarked |
| Previewer | Watermarked | Watermarked | N/A | Watermarked | N/A |
| Open Shared Link (anonymous user) | Watermarked | Watermarked | N/A | Watermarked | N/A |
| Admin (content mgr) | Native | Native | N/A | N/A | N/A |
| Admin (instant login) | Match end user permission | Match end user permission | N/A | Match end user permission | Match end user permission |

| Access Role | Browser (Chrome, Safari, IE9+) | Browser | Mobile (Android, iOS) | Sync (Mac, Windows) |
|---|---|---|---|---|
| Owner | Original or image | Original or image | .pdf | Original |
| Co-Owner | Original or image | Original or image | .pdf | Original |
| Editor | Original or image | Original or image | .pdf | Original |
| Viewer-Uploader | Original or image | Original or image | .pdf | None |
| Previewer-Uploader | image | image | .pdf | None |
| Viewer | image | image | .pdf | None |
| Previewer | image | image | .pdf | None |

FIG. 4

EVENT-DRIVEN GENERATION OF WATERMARKED PREVIEWS OF AN OBJECT IN A COLLABORATION ENVIRONMENT

FIELD

This disclosure relates to the field of client-server web applications, and more particularly to techniques for event-driven generation of watermarked shared objects.

BACKGROUND

Various document sharing environments support multiple editing sessions over a single document with the versioning and updates being handled by technologies in the sharing environment. Such sharing environments often implement some mechanism to provide a visual representation (e.g., a thumbnail or icon) and/or a limited access view (e.g., a preview copy) of the document. In legacy cases such a visual representation is merely a static icon (e.g., a PDF icon or a Microsoft WORD icon). Some sharing environments present a visual indication in the form of a tiny, yet distinguishably accurate representation of the file or object being edited. In some situations such a distinguishably accurate representation might be scalable (e.g., using a scalable vector graphic (SVG)) representation in the form of an icon or in the form of a read-only preview. Such legacy techniques serve a limited set of purposes, yet such limitations become onerous in the context of file sharing. Techniques are needed to improve the application and efficacy of various technologies as compared with the legacy approaches.

SUMMARY

The present disclosure provides improved systems, methods, and computer program products suited to address the aforementioned issues with legacy approaches. More specifically, the present disclosure provides a detailed description of techniques used in systems, methods, and in computer program products for event-driven generation of watermarked shared objects. The various embodiments address the problem of visibility of a watermark applied to a file or object that needs to be changed based on the nature of the intended access (e.g., read only, read-write, etc.) and/or based on the role of the person attempting access to the document. Certain embodiments are directed to technological solutions for monitoring events pertaining to a file or object so as to apply a watermark to an icon or preview mode based on the role of the accessing entity and intended use by the accessing entity, which embodiments advance the technical fields for addressing the problem of applying a watermark to a file or object that needs to be changed based on the nature of the intended access, as well as advancing peripheral technical fields.

Exemplary embodiments operate within a cloud-based collaboration environment, where storage facilities are managed by servers to provide cloud-based storage services to two or more client entities as a service across a network. The servers maintain versions of editable documents using a version indication. Dynamic watermarking applies a first watermark image to a first version of the editable document (e.g., see V1W1) and grants edit access to a first client entity of the two or more client entities. While the first client entity has edit access to the first version of the editable document the system generates a second version of the editable document and applies a second watermark image to the second version of the editable document (e.g., see V2W2) before delivering the second version to a second client entity.

The disclosed embodiments modify and improve over conventional approaches. In particular, practice of the disclosed techniques reduces use of computer memory, reduces demand for computer processing power, and reduces communication overhead needed for event-driven generation of watermarked shared objects. Some embodiments disclosed herein use techniques to improve the functioning of multiple systems within the disclosed environments, and some embodiments advance peripheral technical fields as well.

Further details of aspects, objectives, and advantages of the disclosure are described below and in the detailed description, drawings, and claims. Both the foregoing general description of the background and the following detailed description are exemplary and explanatory, and are not intended to be limiting as to the scope of the claims.

BRIEF DESCRIPTION OF THE DRAWINGS

The drawings described below are for illustration purposes only. The drawings are not intended to limit the scope of the present disclosure.

FIG. 1A1 presents an environment having host servers in a host farm where the servers are configurable to implement event-driven generation of watermarked thumbnails and previews of shared objects, according to an embodiment.

FIG. 1A2 presents a schematic view of workspaces that include dynamically-created content that is generated when implementing event-driven generation of watermarked thumbnails and previews of shared objects, according to an embodiment.

FIG. 1B1 presents a flow for comparison to other flows used when performing event-driven generation of watermarked thumbnails and previews of shared objects.

FIG. 1B2 presents a live watermarking flow used when performing live event-driven generation of watermarked thumbnails and previews of shared objects, according to an embodiment.

FIG. 2A1 is a schematic view of a data flow to implement event-driven generation of watermarked thumbnails and previews of shared objects, according to an embodiment.

FIG. 2A2 is a schematic view of a data flow to implement multi-session event-driven generation of watermarked thumbnails and previews of shared pages, according to an embodiment.

FIG. 2A3 is a schematic view of a data flow to implement event-driven generation of watermarked pages during multiple concurrent edit sessions, according to an embodiment.

FIG. 2A4 is a schematic view of a data flow to implement event-driven generation of watermarked pages during multiple concurrent geographically-distant edit sessions, according to an embodiment.

FIG. 2B1 is a flow chart depicting an overview of operations used during event-driven generation of watermarked thumbnails and previews of shared objects, according to an embodiment.

FIG. 2B2 is a flow chart depicting an overview of operations pertaining to event-driven generation of watermarked thumbnails and previews of shared objects when used in conjunction with a cloud service repository, according to an embodiment.

FIG. 2B3 is a flow chart depicting an overview of operations used during event-driven generation of watermarked thumbnails and previews of shared Google Docs objects, according to an embodiment.

FIG. 3 presents an access role decision map used when implementing live watermarking of thumbnails and previews, according to an embodiment.

FIG. 4 presents a filetype-decision map used when implementing live watermarking of thumbnails and previews, according to an embodiment.

DETAILED DESCRIPTION

Figure 2C:
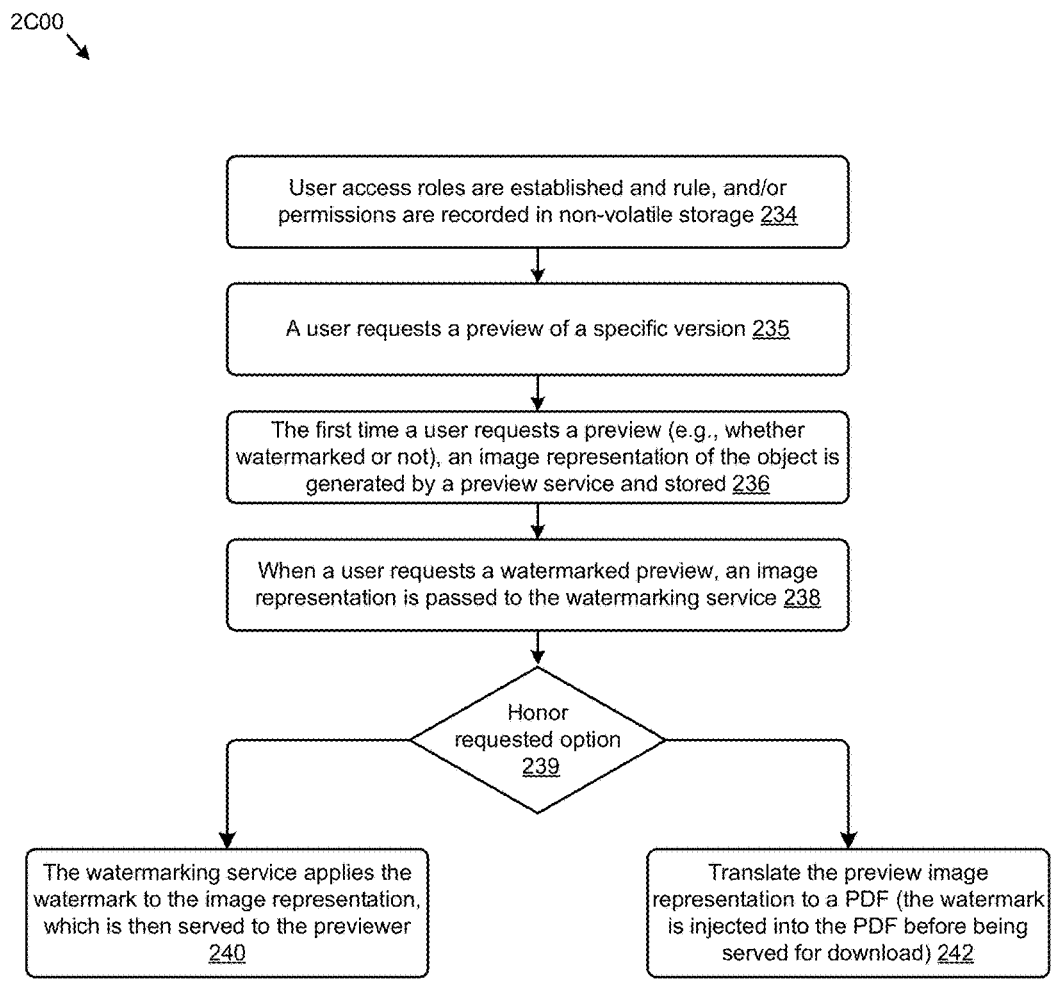
FIG. 2C is a flow chart depicting certain instances of watermarking operations used to implement live watermarking of thumbnails and previews, according to an embodiment.

Some embodiments of the present disclosure address the problem of visibility of a watermark applied to a file or object that needs to be changed based on the nature of the intended access (e.g., read only, read-write, etc.) and/or based on the role of the person attempting access to the document and some embodiments are directed to approaches for monitoring events pertaining to a file or object so as to apply a watermark to an icon or preview mode based on the role and intended use of the accessing entity. More particularly, disclosed herein and in the accompanying figures are exemplary environments, systems, methods, and computer program products for event-driven generation of watermarked shared objects.

Overview

In many situations, a document is "watermarked" such that a viewer of a particular watermarked document will know (e.g., by appearance of a prominent watermark) that that particular document is a "DRAFT" or is "EYES ONLY", or has some other intended limitation as to reviewing, editing and/or performing other operations on the file or object. In legacy systems the underlying document is watermarked, yet in many use cases a document might have one or a few editors, and many readers. This sets up the situation where the editors should see one representation (e.g., icon or preview) and the read-only readers should see a different (e.g., watermarked) representation. This also sets up the situation where the watermarked representations need to be generated/regenerated based on the roles or access rights of the person wanting to view the icon or preview the document.

The problem to be solved is rooted in technological limitations of the legacy approaches. Improved techniques, in particular improved application of technology, are needed to address the problem of visibility of a watermark applied to a file or object that needs to be changed based on the nature of the intended access (e.g., read only, read-write, etc.) and/or based on the role of the person attempting access to the document. More specifically, the technologies applied in the aforementioned legacy approaches fail to achieve the sought-after capabilities of the herein-disclosed techniques for event-driven generation of watermarked documents that support live document sharing and live document editing.

Various embodiments are described herein with reference to the figures. It should be noted that the figures are not necessarily drawn to scale and that the elements of similar structures or functions are sometimes represented by like reference numerals throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiments" or "in other embodiments" in various places throughout this specification are not necessarily referring to the same embodiment or embodiments.

Definitions

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

Descriptions of Exemplary Embodiments

FIG. 1A1 presents a cloud-based environment 1A100 having host servers in a host farm where the servers are configurable to implement event-driven generation of watermarked thumbnails and previews of shared objects. As an option, one or more instances of cloud-based environment 1A100 or any aspect thereof may be implemented in the context of the architecture and functionality of the embodiments described herein. Also, the cloud-based environment 1A100 or any aspect thereof may be implemented in any desired environment.

As shown, a set of users (e.g., collaborators 118) can use one or more instances a variety of user devices 102 to interact with one or more workspaces (e.g., workspace 122$_1$, workspace 122$_2$, etc.) within a cloud-based storage system that provides cloud-based storage services (e.g., for sharing between two or more client entities). The workspaces can be stored in any location, and are at least partially maintained by components within a host farm 101. The host farm 101 supports any variety of processing elements and/or storage devices (e.g., a storage filer) and/or servers such as a host server 115, a sync server 120, a collaboration server 152, a cloud drive server 158, a content server 154, an origin server 156, etc. In some cases the host farm is implemented in whole or in part by a cloud server platform and/or a cloud storage platform.

In some embodiments, a server that participates in providing cloud-based storage services can offer an editable document to a user (e.g., a human user or a computer processor acting as a user) who can edit or modify or overwrite (e.g., to a new version) the file accessed from the host farm 101 without the additional process of manually downloading and storing the file locally on the user device 102 (e.g., smart phone 102$_1$, tablet 102$_2$, IP phone 102$_3$, laptop 102$_4$, workstation 102$_5$, etc.). For example, the file may be ready for the user to edit locally, even without informing the user where the file is stored or without prompting the user for a directory in which to store the file. Such a facility streamlines the frequently repeated accessing and editing processes.

Functions and techniques performed by the host farm 101, and/or the client side components (e.g., client devices, a sync client on a user device 102, etc.) are described herein with further details and with reference to several examples.

FIG. 1A2 presents a schematic view of a cloud-based environment 1A200 having workspaces that include dynamically-created content that is generated when implementing event-driven generation of watermarked thumbnails and previews of shared objects.

The embodiment shown in FIG. 1A2 is merely one example where two collaborators share a document (e.g., a text document or mixed text-graphics document) or object (e.g., images and/or video files), and where each collaborator has his or her own view of the shared object(s) in respective collaborator-specific workspaces (e.g., workspace 122$_1$, workspace 122$_2$, etc.). Moreover, a collaborator (e.g., a user collaborator 123, an administrator collaborator 124, a creator collaborator 125) has an associated profile (e.g., a role profile 127$_1$, role profile 127$_2$, role profile 127$_3$, etc.). Such an associated profile can comprise user information and/or user workspace metadata, and/or access permissions and/or role descriptions. One or more roles can be associated with one or more access configurations, and such roles and/or access configurations can be used in determining rules pertaining to how users share documents. Moreover, such roles and/or access configurations can be used in determining how users can preview, download, sync, print, and otherwise access shared documents. One such regime to determine how users can preview, download, sync, print, and otherwise access shared documents is shown and described as pertaining to FIG. 3).

The embodiment shown in FIG. 1A2 indicates the operation corresponding to an upload of a watermarked document and a subsequent view of one or more representations of the watermarked document. For example, a representation of the watermarked document might be an icon or thumbnail, or a representation of the watermarked document might include a preview view.

FIG. 1B1 presents a flow 1B100 for comparison to other flows used when performing event-driven generation of watermarked thumbnails and previews of shared objects.

The flow shown in FIG. 1B1 commences upon the user indicating a request to access a shared document (see operation 160$_1$). That event causes generation of a static watermark (see operation 164). The static watermark is then applied over the shared document (see operation 166). The statically-watermarked document is shared with other collaborators by making it available for download operations and/or for other delivery mechanisms (see operation 168$_1$).

In some situations, a user is able to edit a watermarked document using a local editor over a local copy. In some situations a user is able to edit a watermarked document using a cloud-based editor over a live-watermarked copy that is shared between multiple collaborators. Use of such local editors and/or cloud-based editors as well as techniques for up-versioning (see operation 161) are discussed hereunder.

FIG. 1B2 presents a live watermarking flow 1B200 used when performing live event-generation of watermarking thumbnails and previews of shared objects. As an option, one or more instances of live watermarking flow 1B200 or any aspect thereof may be implemented in the context of the architecture and functionality of the embodiments described herein. Also, the live watermarking flow 1B200 or any aspect thereof may be implemented in any desired environment.

The aforementioned static application of a watermark (e.g., see FIG. 1B1) can be used in certain collaborative situations. Another approach, depicted in FIG. 1B2 distinguishes over the steps and flow of FIG. 1B1 (e.g., see operation 160$_2$ and operation 168$_2$), and advances sharing and collaboration use models by providing a live watermarking 170 capability such as employed by operation 160$_3$. Live watermarking accesses data structures used to determine roles (e.g., via an access role indication), permissions (e.g., via a permission indication), security requirements (e.g., via a lookup operation), target device(s) in use (e.g., via a device-type and/or operating system indication, etc.), rasterizing variations (e.g., rasterizing by file or rasterizing by page or rasterizing by folder, etc.), application of layers etc. Some data structures serve for coordination, delivery 168$_2$, notification and synchronization in the context of live, multi-session instances of collaborative editing 171. Variations of sharing and collaboration use models that implement live watermarking and live concurrent editing capabilities are discussed hereunder.

FIG. 2A1 is a schematic view of a data flow 2A100 to implement event-driven generation of watermarked thumbnails and previews of shared objects. As an option, one or more instances of data flow 2A100 or any aspect thereof may be implemented in the context of the architecture and functionality of the embodiments described herein. Also, the data flow 2A100 or any aspect thereof may be implemented in any desired environment.

The shown data flow 2A100 implements collaboration when editing. Collaborative editing can take place concurrently with other accesses in multiple concurrent sessions involving multiple concurrently editing users. Live preview generation and other watermarking operations are performed by a watermarking proxy 212. Such a proxy server manipulates preview representations rather manipulating the shared document source. Such operations can be employed to watermark proprietary filetypes without having access to the source code for those applications. The live watermarking service enables live thumbnail views and operations as well as facilitating generation and presentation of dynamically-updated previews (and downloads) of a PDF representation of a watermarked shared document (e.g., a Google Doc). The ability for a collaborator to edit the original file is persistent, and a collaborator with sufficient access rights can edit the original shared file at any time, without regard to any specific state or states of watermarking operations.

This example system of FIG. 2A1 discusses the use model involving editing of a shared document. As shown, the system includes a web application 224 that accesses data sources 202, which may comprise implementations of editors such as a cloud editor 201 (e.g., a Google Doc editor), a local editor 203 (e.g., Microsoft WORD desktop version), or a networked editor 204 (e.g., Microsoft WORD Office365 editor). The shown system further comprises a document editing and storage repository 206, which can include cloud storage 205 (e.g., Google Docs storage), networked storage 209 access (e.g., an enterprise file server), and/or other storage such as storage that is local to the user device (e.g., see local storage $207_1$, and local storage $207_2$). The storage repository can be accessed via one or more application programming interfaces (APIs), and accesses an upload proxy 208. In this environment and in the manner as described hereunder, the web application can support live watermarking of a shared document.

More specifically, the web application 224 can facilitate and/or manage operations pertaining to downloads of a document. Once downloaded from a document editing and storage repository, the document can be used to generate an icon and/or a thumbnail and/or a preview copy of the downloaded document. The specific form and/or look-and-feel and/or accesses can be varied based on the access role of a requesting collaborator and/or the intended purpose as indicated by the requesting collaborator. For example, based on retrieval (e.g., by the watermarking proxy 212) of one or more associated profiles (e.g., a role profile $127_1$, role profile $127_2$, role profile $127_N$, etc.), and based on an access role decision map (see FIG. 3) and/or based on a filetype-decision map (see FIG. 4), the watermarking proxy 212 can perform one or more download operations (see downloaded document 216) and/or various review operations (see preview document 214) and/or various collaborative editing operations. A particular collaborator may carry the attributes of multiple roles, and that particular collaborator may have multiple associated profiles such as a user profile. Any instance of a user profile may include a user name and/or other user credentials or other identifying aspects of the user.

A range of use models are supported by the partitioning and cooperation of operational units as shown. In the case of live collaborative editing of a watermarked document, an instance of a collaboration server 152 is in communication the watermarking proxy to track the in-view page and edits made by a collaborator (e.g., creator collaborator 125, user collaborator 123, etc.). A live edit made on a particular page by one of the collaborators is detected, and the watermarking proxy 212 and/or the collaboration server 152 sends updated copies of the edited page to the other collaborators (if any) who are viewing the same page. In some cases, one collaborator can cause an edit to a downloaded document that affects multiple pages. In such a case, the watermarking proxy 212 and/or the collaboration server 152 sends updated copies of the affected page to the other collaborators (if any) who are viewing the affected page. As such, live editing of documents can proceed with multiple concurrent user collaborators.

FIG. 2A2 is a schematic view of a data flow 2A200 to implement multi-session event-driven generation of watermarked thumbnails and previews of shared pages.

The data flow 2A200 depicts an example partitioning within a cloud-based environment to implement collaborative editing of pages using live watermarks. In a collaboration environment, an editor of a document (e.g., a creator collaborator 125) might want to edit a particular page or range of pages of a document that is shared with others (e.g., a user collaborator 123). As heretofore described, an editor of a document (e.g., a creator collaborator 125) can access the document as a whole, or can access the document by page or by a group of pages. The watermark applied to a particular page is dependent on the role profile of the collaborator at the time that the collaborator accesses the document. In the data flow of FIG. 2A2, the shown collaborative editing includes an edit session 273 and a preview session 275. The edit session 273 is initiated by and operated by a creator collaborator 125. The preview session 275 initiated by and operated by a user collaborator 123.

During the course of editing within edit session 273 (e.g., using any editor accessible or invokable from the web application), the creator collaborator may make changes to a page or a set of pages within the document, and may commit changes to the page or a set of pages within the document by performing a commit operation such as a save operation or a update/close operation or an upload operation. The act of committing changes to a page or a set of pages within the document are reflected as follows: (1) The changes to a page or a set of pages within the document are saved to local storage by the web application $224_1$ (e.g., via an editor application save operation) (2) The collaboration server 152 is notified of the commit event, possibly through a notification manager 217 (3) any of the viewers engaged in a real-time notifications session, receive notifications such that if a new change to the document are committed, then the viewer gets a new notification, and in some cases, the viewer pre-fetches a range of pages. Upon receiving such notification or notifications, the viewing application in use by the user collaborator 123 can decide which pages to fetch (e.g., based on what page or pages are being viewed in the user's session. In this example, each concurrent session receives the page or set of pages within the document after having been re-watermarked so as to reflect the just committed changes.

As an example, when an editor (e.g., creator collaborator) is editing a particular page or slide in a presentation file (e.g., a PowerPoint document), there might be previewers (e.g., other user collaborators) who are viewing that same page or slide (e.g., using the web application $224_2$ or a view mode of an editor application). Upon their demand, previewers each receive a watermarked version of the then current version of the page or slide (e.g., via delivery of a preview document 214 in response to the demand), and, continuing this example, the watermark applied to preview document 214 might indicate the version of the slide (e.g., with a version icon or other version indication), and might further indicate what user or users have edit access right to the document. When the editor commits edits to the page or slide, the changes are committed to the editor's local storage, the watermarking proxy is notified, and the watermarking proxy responds to demands for the specific updated pages or slides being accessed by the previewers (e.g., via an updated version of preview document 214). The page comparator 218 identifies page changes, and the updated page or slide that is presented to the previewer(s) bears a watermark that indicates that a change has been applied.

Further additions or deletions may be made to pages or slides by the editor (e.g., a human editor or a computer program) at any point in time, and any previewing users who are previewing a range of affected pages or slides at that moment in time automatically receive updated previews corresponding to the affected range of pages or slide, and the affected pages or slides bear updated watermarks. As a specific example, an editor might delete a particular page or slide from a document and commit the changes. Contemporaneously, one or more previewers might be viewing the particular deleted page or slide and/or a range of pages or slides that include the particular deleted page or slide. In such a case, the previewers set of pages is adjusted to reflect the deleted page. In one embodiment, the particular deleted page receives a new watermark indicating the deletion of the page, and possibly a solid black or solid white background. It is also possible that the affected set of pages being previewed includes added pages as well as deleted pages. In such a case the added pages are delivered to the previewers and the deleted pages receive a new watermark indicating the deletion of the pages, and possibly a solid black or solid white background. In some cases such as when affected set of pages being previewed includes an added page as well as a deleted page (e.g., "old page 2" is deleted, and "new page 2" is added) the net affect can be collapsed such that the net effect of an addition and a deletion is collapsed to presenting "new page 2" in the range of pages.

A range of use models are supported by the partitioning and cooperation of operational units as shown. In the case of live collaborative editing of a watermarked document, an instance of a collaboration server 152 is in communication the watermarking proxy to track the in-view pages and edits made by one or more editors. A live edit made on a particular page by one of the editing collaborators is detected, and the watermarking proxy 212 and/or the collaboration server 152 is set to deliver updated watermarked copies of the edited page to the other collaborators (if any) who are viewing the same page. In some cases, one collaborator can cause an edit to a document that affects multiple pages. In such a case, the watermarking proxy 212 and/or the collaboration server 152 is set to send updated copies of the affected page to the other collaborators (if any) who are viewing and/or editing the affected pages. As such, live editing of documents can proceed with multiple concurrent editors, and all previewers are able to receive notification of changed pages demanding and receiving updated watermarked pages (e.g., changed pages) as may have been edited by any of the editors.

Strictly as one example, the shown data flow implements a method for watermarking an editable document (e.g., a presentation document, or a spreadsheet document, or a formatted text document, or an image document, or a photo, or a portable document, etc.). The exemplary method proceeds as follows: The server or servers comprising the collaboration server access one or more storage devices and publish availability of services that can be accessed by two or more client entities over a network. The collaboration server maintains an editable document in a first version using a version indication. An agent (e.g., a watermarking proxy) applies a first watermark image to the first version of the editable document and grants edit access to a first client entity. As the first client entity edits the document (e.g., and commits a change), the collaboration server generates a second version of the editable document while the first client entity still has edit access to the first version of the editable document. A second client entity requests access (e.g., a read or preview access, as shown) to the editable document, and the watermarking proxy applies a second watermark image to the second version of the editable document before delivering the second version to a second client entity. The second watermark image might indicate that the document is open for editing by another user or agent, and might further indicate the identity of the other user or agent.

The foregoing live editing capability can be implemented in a variety of environments. For example, a multi-session live editing capability supports concurrent editing sessions and can support a variety of use models and operations thereto, some of which are shown and discussed below.

FIG. 2A3 is a schematic view of a data flow 2A300 to implement event-driven generation of watermarked pages during multiple concurrent edit sessions. The data flow 2A300 depicts an example partitioning to implement multiple concurrent editing session over multiple pages using live watermarks. In a collaboration environment, a first editor of a document (e.g., a first person in the role of a creator collaborator 125) might want to edit a particular page or range of pages of a document that is shared with others (e.g., a second person in the role of a user collaborator 123). As heretofore described, an editor of a document (e.g., a creator collaborator 125) can access the document as a whole, or can access the document by page or by a group of pages (e.g., using web application $224_3$). The watermark applied to a particular page is dependent on the role profile of the collaborator at the time that the collaborator accesses the document. In the data flow of FIG. 2A3, the shown collaborative editing includes a first edit session 277 using web application $224_3$ and a second edit session 279 using web application $224_4$.

During the course of editing within first edit session 277, the creator collaborator may make changes to a page or a set of pages within the document, and may commit changes to the page or a set of pages within the document by performing a commit operation such as a save operation or a update/close operation or an upload operation.

Strictly as one embodiment, the collaboration server uses a notification manager 217 and/or engages in a protocol with a watermarking proxy or notification server to determine if the same page or set of pages within the document are being concurrently displayed (e.g., in a first edit session 277 and concurrently in a second edit session 279). Based on the determination, the concurrently displayed page or set of pages within the document is re-watermarked and re-delivered to the concurrently accessing users so as to reflect the just committed changes.

In one use model, the progression commences upon (1) determining that a first edit session on a particular object is established between a first client device and the server; (2) determining that a second edit session on the same object is established between a second client device and the server; (3) identifying that a particular edited page of the object has been committed (e.g., based on a committed page edit operation from the first edit session); (4) determining if the second edit session is viewing a presentation of the particular edited page; and (5) applying an updated watermark image to an instance of the particular edited page before delivering to the second edit session.

The foregoing use models can operated over various objects such as a ".docx" document, or a ".pptx" object. In exemplary cases the updated watermark image indicates an aspect of the first edit session, such as a user identification (e.g., the user identification of the first editor of a document), a first timestamp, a second timestamp, a session status, and/or a session duration, and/or an indication that there are multiple concurrent editing sessions open (e.g., a list that identifies each of the multiple concurrent editing sessions).

The foregoing live editing capability can be implemented in a variety of environments. For example, operations within the data flow of the of FIG. 2A2, and/or within the data flow of FIG. 2A3, and/or within the data flow of the following FIG. 2A4 comprise additional use models. Operations thereto are shown and discussed below. In particular, the notification manager 217 can be implemented on multiple servers that are located in multiple geographies. Such an embodiment supporting low latency notification is shown and described as pertains to FIG. 2A4.

FIG. 2A4 is a schematic view of a data flow 2A400 to implement event-driven generation of watermarked pages during multiple concurrent edit sessions initiated on client devices (e.g., user devices) that are geographically distant. The data flow 2A400 depicts an example partitioning to implement multiple concurrent editing session over multiple pages using multiple notification servers (e.g., first notification server $153_1$, second notification server $153_2$, etc.). In a collaboration environment, a first editor of a document (e.g., a first person in the role of a creator collaborator 125) might want to edit a particular page or range of pages of a document that is shared with others (e.g., a second person in the role of a user collaborator 123). As heretofore described, an editor of a document (e.g., a creator collaborator 125) can access the document as a whole, or can access the document by page or by a group of pages (e.g., using web application $224_3$). The watermark applied to a particular page is dependent on the role profile of the collaborator at the time that the collaborator accesses the document. In the data flow of FIG. 2A4, the shown collaborative editing includes a first edit session originating from a first geography using web application $224_3$ and a second edit session originating from a second geography using web application $224_4$.

During the course of editing within first edit session 277, the creator collaborator may make changes to a page or a set of pages within the document, and may commit changes to the page or a set of pages within the document by performing a commit operation such as a save operation or a update/close operation or an upload operation, a scroll operation away from the page, clicking away from the page, or other committed page edit operation. Such an event is processed by the first notification server $153_1$.

During the course of editing within first edit session 277 (e.g., using any editor accessible or invokable from the web application), the creator collaborator may make changes to a page or a set of pages within the document, and may commit changes to the page or a set of pages within the document by performing a commit operation such as a save operation or a update/close operation or an upload operation. The act of committing changes to a page or a set of pages within the document are reflected as follows: (1) The changes to a page or a set of pages within the document are saved to local storage by the web application $224_1$ (e.g., via an editor application save operation) (2) The collaboration server 152 is notified of the commit event via first notification server $153_1$, (3) any of the viewers engaged in a real-time notifications session, receive notifications such that if new changes to the document are committed, then the viewer gets new notifications so that the viewer can fetches the affected pages. Upon receiving such notification or notifications, the viewing application in use by the user collaborator 123 can decide (e.g., based on user actions such as scrolling) which pages to fetch (e.g., based on what page or pages are being viewed in the user's session, and/or based on which pages are likely to be viewed in the near future). In this example, each concurrent session receives the page or set of pages within the document after having been re-watermarked so as to reflect the just committed changes.

In another embodiment, a user (e.g., first user, second user, nth user, editor entity, etc.) uploads a document and establishes sharing permissions to be granted to other users (e.g., first user, second user, nth user, etc.). Another user (a first edit session user), accesses (e.g., downloads) the shared document for page-by-page read-write access, which page-by-page access invokes application of a watermark using any of the herein-disclosed watermarking techniques. Yet another user (a second edit session user), accesses (e.g., downloads) the shared document for page-by-page read-write access, which page-by-page access invokes application of a watermark using any of the herein-disclosed watermarking techniques. In some cases, a watermarking service applies a watermark to the image representation using a layered technique rather than a rasterized technique. In some cases, a watermarking service applies a watermark to the image representation using a rasterization technique rather than a layered technique.

When the first edit session user makes a change or series of changes including at least one sequence-terminating change to the then currently-in-view page an instance of a notification server (e.g., a geographically proximal notification server such as first notification server $153_1$), sends the event to the collaboration server 152. Other notification servers (e.g., second notification server $153_2$) that may be geographically proximal to other users (e.g., user collaborator 123) handle notification events for respective geographically proximal users.

FIG. 2B1 is a flow chart depicting an overview of operations 2B100 used during event-driven generation of watermarked thumbnails and previews of shared objects. As an option, one or more instances of operations 2B100 or any aspect thereof may be implemented in the context of the architecture and functionality of the embodiments described herein. Also, the operations 2B100 or any aspect thereof may be implemented in any desired environment.

One example, of such an environment is in a local editing and storage environment. For example, when a user indicates intent to create a new shared document, the web application creates an empty document (e.g., a text file, a mixed text and graphics file, an image file, a video file, etc.) depending on the selected file type and file format (see operation 2B118). This empty file or container is saved to the storage repository (see operation 2B120). The indication that the new document is to be shared is indicated, for example, using metadata that is stored in a file system (e.g., in a file system directory) or stored in any database accessible to the web application (see operation 2B122). Other users (e.g., collaborators) using the web application can access the shared document so as to be able to edit. More specifically, when a collaborator chooses to edit a file, the file is loaded into an editor (e.g., using a window that is managed by the web application (see operation 2B124)). Closing the editor triggers a process to save the document back to a database that is directly accessible to the web application (see operation 2B126). Such a detected event invokes operations to retrieve the newly-edited file from the document editing and storage repository (see operation 2B128), which document is sent to the upload proxy (see operation 2B130). The upload proxy sends the downloaded (e.g., newly-edited) file to the local storage location, overwriting the previous copy of the file with a new version (see operation 2B134).

Also, the operations 2B100 or any aspect thereof may be implemented in any desired environment, including a cloud environment, such as is shown and described in FIG. 2B2.

FIG. 2B2 is a flow chart depicting an overview of operations 2B200 pertaining to event-driven generation of watermarked thumbnails and previews of shared objects when used in conjunction with a cloud service repository. As an option, one or more instances of operations 2B200 or any aspect thereof may be implemented in the context of the architecture and functionality of the embodiments described herein. Also, the operations 2B200 or any aspect thereof may be implemented in any desired environment.

An example of such an environment is a cloud service environment. When a user identifies a new document, the web application loads the file into a storage facility accessible to the cloud service repository (see operation 2B220). A shared link and/or other metadata is retrieved (e.g., from the cloud service repository). Such metadata is stored in a database accessible to the web application (see operation 2B222). Other users (e.g., collaborators) of the web application can click on the given link so as to be able to edit. Collaborative editing is supported. More specifically, when a collaborator chooses to edit an object, editing events that affect a particular page are captured, analyzed, and changes are presented to other collaborators who are then concurrently viewing the affected page (see operation 2B224). Closing the editor triggers a process to save the document back to a database (e.g., to a cloud service repository) that is accessible to the web application. Such closing events or commit events (e.g., deriving from a SAVE operation) or exiting events invoke processes to upload the edited document (see operation 2B226), which is then sent to the upload proxy (see operation 2B228). The upload proxy sends the newly-edited object to a persistent storage location (e.g., to a storage filer). Saving an edited version increments a version identifier (see operation 2B230). Versions and/or their watermarks can be kept in storage indefinitely, or can be evicted from storage after a time or duration (e.g., two months), or can be evicted when there are multiple versions stored (e.g., three versions back), or when other version persistence rules apply. This flow can be varied to include any variations or implementations of live watermarking.

FIG. 2B3 is a flow chart depicting an overview of operations 2B300 used during event-driven generation of watermarked thumbnails and previews of shared Google Docs objects. As an option, one or more instances of operations 2B300 or any aspect thereof may be implemented in the context of the architecture and functionality of the embodiments described herein. Also, the operations 2B300 or any aspect thereof may be implemented in any desired environment.

An example of such an environment is in a cloud environment, such as in the Google Docs environment. In a Google Docs environment, for example, when a user clicks on the New>Google Docs button, the web application creates an empty ".docx", ".xlsx", or ".pptx" or other empty document depending on the selected file format (see operation 2B318). This empty file is uploaded to the document editing and storage repository using the document editing and storage repository APIs, such as through the Google Docs APIs (see operation 2B320). Through such a mechanism, a Google Docs shared link and Google Doc metadata is retrieved. Such a Google Docs shared link and Google Doc metadata is stored in a database accessible to the web application (see operation 2B322). Other users (e.g., collaborators) of the web application can click on the given link so as to be able to edit. More specifically, when a collaborator chooses to edit a file, the file is uploaded to the document editing and storage repository and the collaborator is redirected to a Google Docs Editor window that is wrapped in a window managed by the web application (see operation 2B324). Closing this wrapping window triggers a process to save the document back to a database that is directly accessible to the web application (see operation 2B326). Such a detected event invokes an API call to the document editing and storage repository to download the newly-edited file from the document editing and storage repository (see operation 2B328), which downloaded document is sent to a server such as an upload proxy (see operation 2B330). In succession, the detected event invokes an API call to the document editing and storage repository with instructions to delete the file from the document editing and storage repository (see operation 2B332). The upload proxy sends the downloaded (e.g., newly-edited) file back to the storage filer, overwriting the previous copy of the file with a new version (see operation 2B334).

This flow can be varied to include variations of features or implementations of live watermarking, as shown and discussed as pertaining to FIG. 2C.

FIG. 2C is a flow chart depicting certain instances of watermarking operations 2C00 used to implement live watermarking of thumbnails and previews. As an option, one or more instances of watermarking operations 2C00 or any aspect thereof may be implemented in the context of the architecture and functionality of the embodiments described herein. Also, the watermarking operations 2C00 or any aspect thereof may be implemented in any desired environment.

The shown flow commences by performing steps to establish or record access roles. Access roles and corresponding rules and/or permissions are recorded in non-volatile storage (see operation 234). At some point, a collaborator requests a preview of an object such as a photo or a video clip or a specific version of a file (see operation 235). The first time a user requests a preview (watermarked or not), an image representation of the object is generated by the preview service and stored in the storage filer (see operation 236).

When a user requests a watermarked preview, an image (e.g., a ".png" image or a PDF of a ".png" image) is generated and passed to the watermarking service (see operation 238). In any of the foregoing environments, a collaborator operates a user device, and the user device executes at least a portion of the web application. When a user requests a watermarked preview (see operation 238), the user device executes the aforementioned portion of the web application and requests the image (e.g., a ".png" image or a PDF of a ".png" image) to be returned in a specific format, which format is a specific format that can be rendered to the specific user device. The shown decision 239 honors the request by the user device for the image to be returned in a specific format. In some cases, the request is honored in a manner such that the watermarking service applies the watermark to the image representation, which is layered or rasterized and served to the previewer (see operation 240). In some situations, the request is honored in manner such that the watermarking service translates the preview image representation to a PDF and the watermark is injected into the PDF before being served for download to the requesting device (see operation 242).

Having a representation of the stored document on the storage filer, operation 236 serves to apply a dynamically-generated watermark onto the document to generate a preview. Such a watermarked document can be generated, for example, by inserting the watermark into a rasterized representation of the document (e.g., where each page is converted to an image prior to applying the watermark). The resulting set of document pages with embedded watermarks can be served page-by-page upon request, or all pages can be first placed into a single "container" file (for example, a PDF) prior to serving the entire container with all pages of the document. The advantage of serving a single container or file is it simplifies operation of the client application as it only needs to download the file and present it in a file viewer. There are advantages of using page-by-page retrieval, such as when pages are served separately, at least in that the client doesn't need to download the whole document before displaying it (e.g., downloading just those pages requested by the user). As such, page-by-page delivery can incur shorter delays before the requested pages are displayed. Also smaller bandwidth consumption and smaller client memory footprint accrue to the page-by-page delivery techniques.

Since rasterizing all document's pages prior to applying the watermark can be a computationally time consuming operation, the following technique can be used to minimize the delay for serving the document: (1) when a document is first uploaded or the first time a user requests a preview (watermarked or not), a rasterized "pre-watermarked" representation of the document is generated and stored in the storage filer (see operation 236), which results in rasterization of all pages of the document, but no watermark is applied to them yet; and (2) when a user requests a watermarked preview of the document, the "pre-watermarked" representation is passed to the watermarking service (see operation 238). The watermarking service applies the watermark to obtain the "watermarked" representation, and serves it to the previewer (see operation 240). In situations when the previewer requests only a single page of the document, only that page is watermarked and served. In situations when the previewer requests the document as a single file, the watermarking service places all the watermarked pages into a "container" file (such as a PDF) and serves it for download (see operation 242).

In the case of streaming a single "container" file, the service can generate the file on the fly in a streaming fashion. For example, the service can start streaming the first page to the previewer after the watermark is applied to the first page but before watermarks are applied to other pages. Similarly, the second page can be served before the third page is watermarked, and so on.

FIG. 3 presents an access role decision map 300 used when implementing live watermarking of thumbnails and previews. As an option, one or more instances of access role decision map 300 or any aspect thereof may be implemented in the context of the architecture and functionality of the embodiments described herein. Also, the access role decision map 300 or any aspect thereof may be implemented in any desired environment.

The embodiment shown in FIG. 3 is merely one example. Given an access role (e.g., "Owner", "Co-Owner", "Editor", etc.) a set of actions can be determined. For example, and as shown, if the role is "Owner", then the supported preview modes are "Watermarked" and "Native". This mapping is designated in FIG. 3 as "Both (option)". A set of access roles are listed in FIG. 3, however the roles shown and respective allowed actions are merely examples.

FIG. 4 presents a filetype-decision map 400 used when implementing live watermarking of thumbnails and previews. As an option, one or more instances of filetype-decision map 400 or any aspect thereof may be implemented in the context of the architecture and functionality of the embodiments described herein. Also, the filetype-decision map 400 or any aspect thereof may be implemented in any desired environment.

The embodiment shown in FIG. 4 is merely one example. Given an access role (e.g., "Owner", "Co-Owner", "Editor", etc.) a set of actions can be determined. For example, and as shown, if the role is "Owner", then based on the device type or characteristics of the device, various supported preview filetypes are permitted and/or used (or not permitted and/or not used). The filetype served can be determined based on a request and/or can be based on a browser (Chrome, Safari, IE9+) and/or can be based on an operating system (e.g., Android, iOS, etc.) and/or can be based on a device characteristic (e.g., mobile device, desktop device, Mac, Windows machine, etc.) and/or can be based on an operation such a "SYNC".

Further, any one or more of a variety of permissions (e.g., file system permission, sharing permissions, etc.) can be used when determining when and how to present watermarked previews and when and how to permit or deny downloads. A content owner can restrict access for file editing to only certain collaborators while enforcing watermarked previews and downloads for other users in the same folder. In some embodiments content owners are presented with a user interface to apply access options. Strictly as one example, such a user interface can present options to allow or restrict preview access. In one case, such a user interface can present options to independently allow or restrict preview access to the original copy, and to independently allow or restrict preview access to the watermarked copy.

Additional Features

In one embodiment, additional security characteristics are considered. For example, upon the event of a document download, it is possible to apply the watermark to the image representation and insert the rasterized image into a PDF before the document is served for download. For example, a watermark formed of an email alias (e.g., a requestor's email alias) might be rasterized into an image before being inserted into a PDF.

For certain document types, it is felicitous to store the original file as well as a converted image representation of the file that is served to users when they request a preview of the document.

Bandwidth usage for downloading a preview can be estimated prior to generating the watermarked preview version. For example, the size of a watermarked document can be predetermined, and various precalculations can be performed to estimate the effects of using of one or another of alternative watermarking techniques. For example, the estimate can be used to determine whether a lossless format (e.g., ".PNG") or lossy format (e.g., ".JPG") is to be used.

The foregoing supports many use cases, many variations of watermark types and appearances, action options, logging functions, and other use model features. A subset of watermark types, watermark appearances, action options, logging functions, and other use model features are given in the following tables.

TABLE 1

Use cases

| Use Case # | Description |
|---|---|
| Case 1 | As a marketing manager at a financial services firm, I need the monthly investor newsletter watermarked with a confidentiality notice having the recipient name to remind them they are responsible for the confidentiality of the information. Other confidentiality notices might include the word CONFIDENTIAL or a word that conveys the meaning of CONFIDENTIAL (e.g., in any language). |
| Case 2 | As an admin in an organization, I need to ensure that my project designs are never shared externally without a watermark so it would be difficult for a malicious party to acquire and post it elsewhere on the Internet. |
| Case 3 | As a data room administrator, I need to know the leak source and leak time of a document leaked from a folder (collection of documents identified a collected in a named folder or named directory). |
| Case 4 | As a writer, I need to know the source of a leak of my manuscript so I know who to start with for the investigation. |
| Case 5 | As a production coordinator, I need to make sure the manuscripts that I am printing are watermarked with the name of the recipient to deter re-sharing, as any leak could cost millions in rewrite costs. |

The foregoing are merely some use cases. Other use cases are possible, moreover different use cases are facilitated by the use of watermarks that have differing appearances. A selected set of such watermarks, listed by appearance characteristics, are given in Table 2.

TABLE 2

Appearance of watermark

| ID # | Description |
|---|---|
| W1 | Text: Watermark text is based on the e-mail address of the accessing user. If the e-mail address is not available (e.g., non-logged-in user), then substitute IP address for e-mail alias |
| W2 | Sizing: A watermark size is calculated to cover a significant portion of the page without compromising readability |
| W3 | Timestamp: Appearance includes the date and time of an access |
| W4 | Custom: Appearance includes a field with custom text and/or graphics |

Watermarks can carry additional attributes, some of which can be applied in certain situations, or when specific options are enabled, such as those shown in Table 3.

TABLE 3

Options

| ID # | Description |
|---|---|
| O1 | Apply watermark to preview view |
| O2 | Do not allow selecting or copying of text or image mark |
| O3 | Download a layered PDF representation of the file as a rasterized PDF |
| O4 | Download a layered PDF representation in layers |
| O5 | Print options support print of layered PDF |

Use of watermarks can be determined by events, and such events can be logged. Specific administrative actions and user actions can be recorded in a log, and stored for later access and analysis, such as those shown in Table 4.

TABLE 4

Usage logs to record watermark-related actions

| ID # | Description |
|---|---|
| L1 | Logging the action of setting a watermark |
| L2 | Logging the action of modifying a watermark |
| L3 | Logging the action of deleting a watermark |

Use models can be selected (e.g., so as to permit or deny only certain next actions) and/or use models being used can be detected by observing a sequence of events. Table 5 lists an abbreviated set of features related to operation of various use models.

TABLE 5

Use model features

| ID # | Description |
|---|---|
| F1 | Emit a warning when a previously watermarked file is moved out of a watermarked folder, or block the move (watermark stays with file) |
| F2 | Facilitate a bulk watermark option (e.g., by checking boxes next to files) |
| F3 | Administrative automation to apply a watermark over all content placed in a folder |
| F4 | Indicate "Watermarked" in details section of user interface (e.g., if watermarked) |
| F5 | Graphics on watermark |
| F6 | Control over watermark placement |
| F7 | Control over opacity |
| F8 | Control over fonts |
| F9 | Apply pixelated watermark onto every document page to increase security by preventing easy scrubbing by changing a color scheme or suppressing all non-black/white colors |
| F10 | Encode a watermark onto every frame of a video clip |
| F11 | Encode a watermark onto every Nth frame of a video clip |
| F12 | Encode a watermark onto the first S seconds or a selection of frames of a video clip |

Additional Embodiments of the Disclosure

Additional Practical Application Examples

Figure 5A:
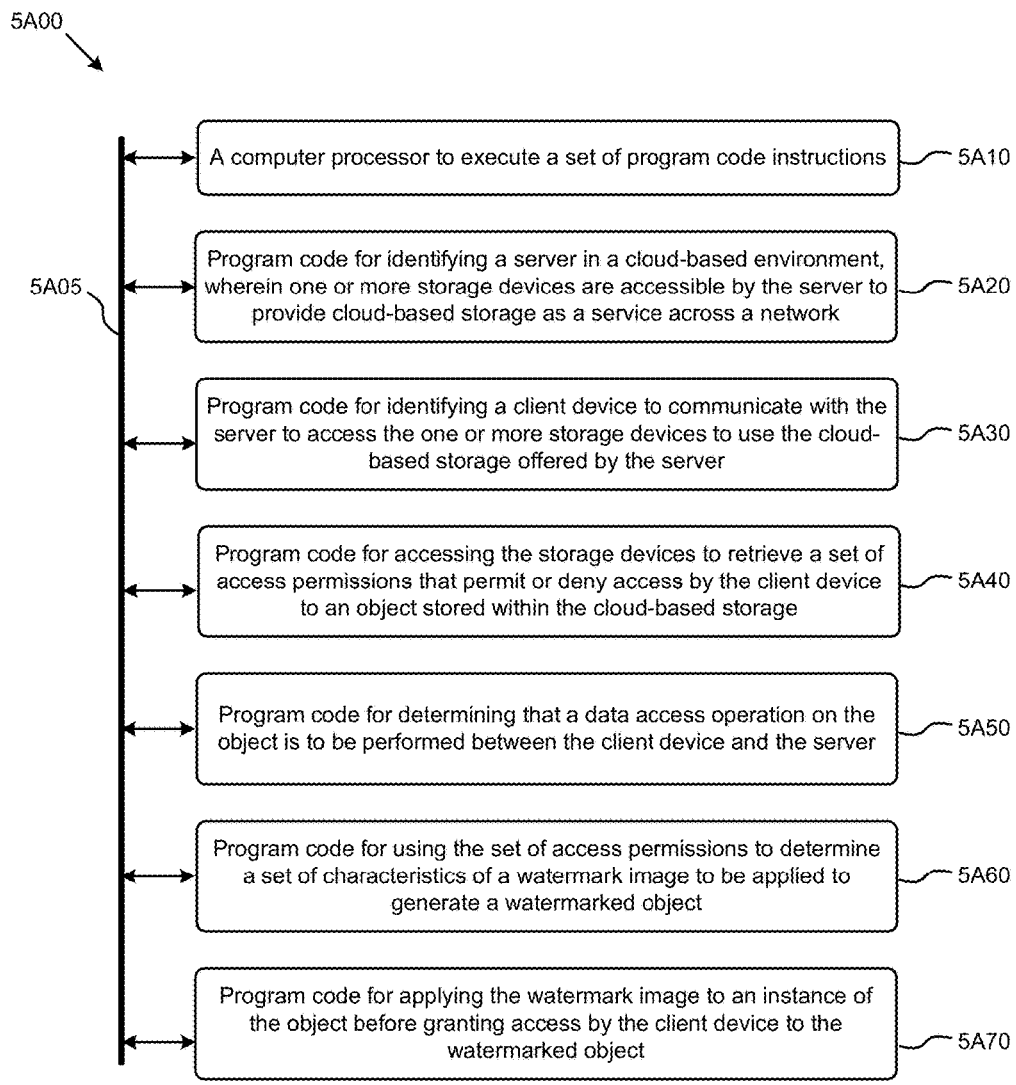
FIG. 5A depicts a system as an arrangement of computing modules that are interconnected so as to operate cooperatively to implement certain of the herein-disclosed embodiments.

FIG. 5A depicts a system 5A00 as an arrangement of computing modules that are interconnected so as to operate cooperatively to implement certain of the herein-disclosed embodiments. The partitioning of system 5A00 is merely illustrative and other partitions are possible.

The shown system can operate in an environment having a server in a cloud-based environment. One or more storage devices are accessible by the server to provide cloud-based storage as a service across a network which in turn can access one or more client devices that communicate with the server to request access to the one or more storage devices (e.g., to use the cloud-based storage offered by the server).

As shown, the system 5A00 includes a computer processor 5A10. The system further comprises steps for: identifying a server in a cloud-based environment, wherein one or more storage devices are accessible by the server to provide cloud-based storage as a service across a network (see operation 5A20); identifying a client device to communicate with the server to access the one or more storage devices to use the cloud-based storage offered by the server (see operation 5A30); accessing the storage devices of the cloud-based storage to retrieve a set of access permissions that permit or deny access by the client device to an object stored within the one or more storage devices of the cloud-based storage (see operation 5A40); determining that a data access operation on the object is to be performed between the client device and the server (see operation 5A50); using the set of access permissions to determine a set of characteristics of a watermark image to be applied to generate a watermarked object (see operation 5A60); and applying the watermark image to an instance of the object before granting access by the client device to the watermarked object (see operation 5A70). The access permissions can be, for example, a write access grant that grants write access when using a cloud-based editor or for write access when using a local editor of a type that is identified by the cloud services.

In some cases, it is possible that an object can be removed or copied from the cloud-based environment and stored in a foreign environment, and then edited from that foreign environment, however uses in the foreign environment defeat the benefits of the cloud-based storage provided as a service across a network that is accessed by multiple collaborators.

Figure 5B:
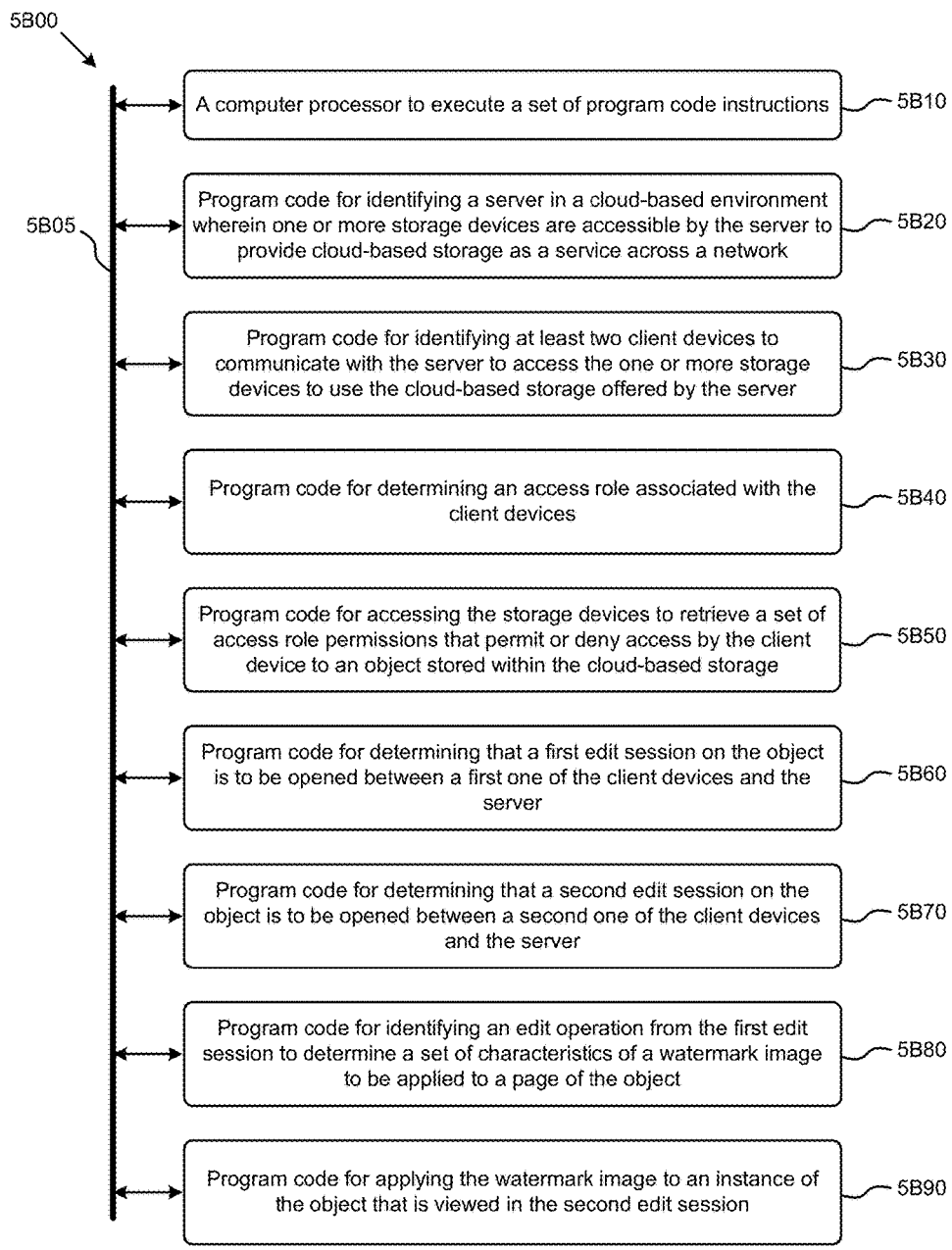
FIG. 5B depicts a system as an arrangement of computing modules that are interconnected so as to operate cooperatively to implement certain of the herein-disclosed embodiments.

FIG. 5B depicts a system 5B00 as an arrangement of computing modules that are interconnected so as to operate cooperatively to implement certain of the herein-disclosed embodiments. The partitioning of system 5B00 is merely illustrative and other partitions are possible.

FIG. 5B depicts a block diagram of a system to perform certain functions of a computer system. As an option, the system 5B00 may be implemented in the context of the architecture and functionality of the embodiments described herein. Of course, however, the system 5B00 or any operation therein may be carried out in any desired environment.

The system 5B00 comprises at least one processor and at least one memory, the memory serving to store program instructions corresponding to the operations of the system. As shown, an operation can be implemented in whole or in part using program instructions accessible by a module. The modules are connected to a communication path 5B05, and any operation can communicate with other operations over communication path 5B05. The modules of the system can, individually or in combination, perform method operations within system 5B00. Any operations performed within system 5B00 may be performed in any order unless as may be specified in the claims.

The shown embodiment implements a portion of a computer system, presented as system 5B00, comprising a computer processor to execute a set of program code instructions (see module 5B10) and modules for accessing memory to hold program code instructions to perform: identifying or configuring a server in a cloud-based environment wherein one or more storage devices are accessible by the server to provide cloud-based storage as a service across a network (see module 5B20); identifying at least two client devices to communicate with the server to access the one or more storage devices to use the cloud-based storage offered by the server (see module 5B30); determining an access role associated with the client devices (see module 5B40); accessing the storage devices to retrieve a set of access role permissions that permit or deny access by the client device to an object stored within the cloud-based storage (see module 5B50); determining that a first edit session on the object is to be opened between a first one of the client devices and the server (see module 5B60); determining that a second edit session on the object is to be opened between a second one of the client devices and the server (see module 5B70); identifying an edit operation from the first edit session to determine a set of characteristics of a watermark image to be applied to a page of the object (see module 5B80); and applying the watermark image to an instance of the object that is viewed in the second edit session (see module 5B90).

The system 5B00 can process using a ".docx" document, which document can be watermarked with a watermark image that indicates an aspect of one of the edit sessions (e.g., an aspect of the first session to be opened). Various aspects of the first edit session can be coded into the watermark, including any one or more instances of a user identification code, a first timestamp code, a second timestamp code, a session status, and a session duration. Cosmetic or restriction watermarks are also used within the system 5B00. Some embodiments further comprise delivering the updated watermarked page to the second edit session, and identifying a particular second edited page of the object based at least in part on a committed page edit operation from the second edit session. An updated watermark image is applied to an instance of the particular second edited page to generate a second updated watermarked page (e.g., wherein the updated watermark image indicates an aspect of the first edit session such as a user identification, or a first timestamp, or a second timestamp, or a session status, or a session duration, or any combination thereof). In some cases the object is a video clip and the updated watermark image is applied to a selection of frames of the video clip. Or, in some cases, the object is a photo and the updated watermark image is a layer over the photo. A watermark might be based on at least a portion of the user credentials, which in turn can be used in determining a leak source.

Figure 5C:
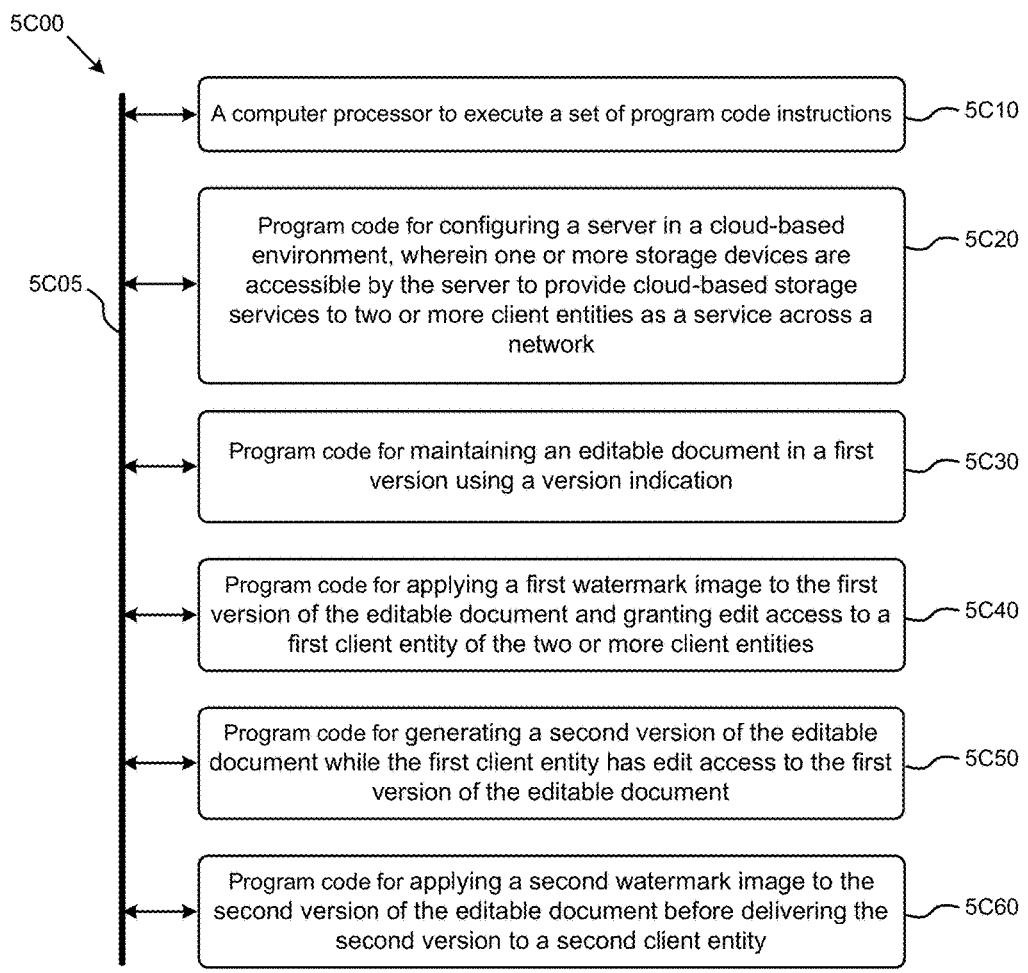
FIG. 5C depicts a system as an arrangement of computing modules that are interconnected so as to operate cooperatively to implement certain of the herein-disclosed embodiments.

FIG. 5C depicts a system 5C00 as an arrangement of computing modules that are interconnected so as to operate cooperatively to implement certain of the herein-disclosed embodiments. The partitioning of system 5C00 is merely illustrative and other partitions are possible. As an option, the present system 5C00 may be implemented in the context of the architecture and functionality of the embodiments described herein. Of course, however, the system 5C00 or any operation therein may be carried out in any desired environment. The system 5C00 comprises at least one processor and at least one memory, the memory serving to store program instructions corresponding to the operations of the system. As shown, an operation can be implemented in whole or in part using program instructions accessible by a module. The modules are connected to a communication path 5C05, and any operation can communicate with other operations over communication path 5C05. The modules of the system can, individually or in combination, perform method operations within system 5C00. Any operations performed within system 5C00 may be performed in any order unless as may be specified in the claims. The shown embodiment implements a portion of a computer system, presented as system 5C00, comprising a computer processor to execute a set of program code instructions (see module 5C10) and modules for accessing memory to hold program code instructions to perform: configuring a server in a cloud-based environment, wherein one or more storage devices are accessible by the server to provide cloud-based storage services to two or more client entities as a service across a network (see module 5C20); maintaining an editable document in a first version using a version indication (see module 5C30); applying a first watermark image to the first version of the editable document and granting edit access to a first client entity of the two or more client entities (see module 5C40); generating a second version of the editable document while the first client entity has edit access to the first version of the editable document (see module 5C50); and applying a second watermark image to the second version of the editable document before delivering the second version to a second client entity (see module 5C60).

System Architecture Overview
Additional System Architecture Examples

Figure 6A:
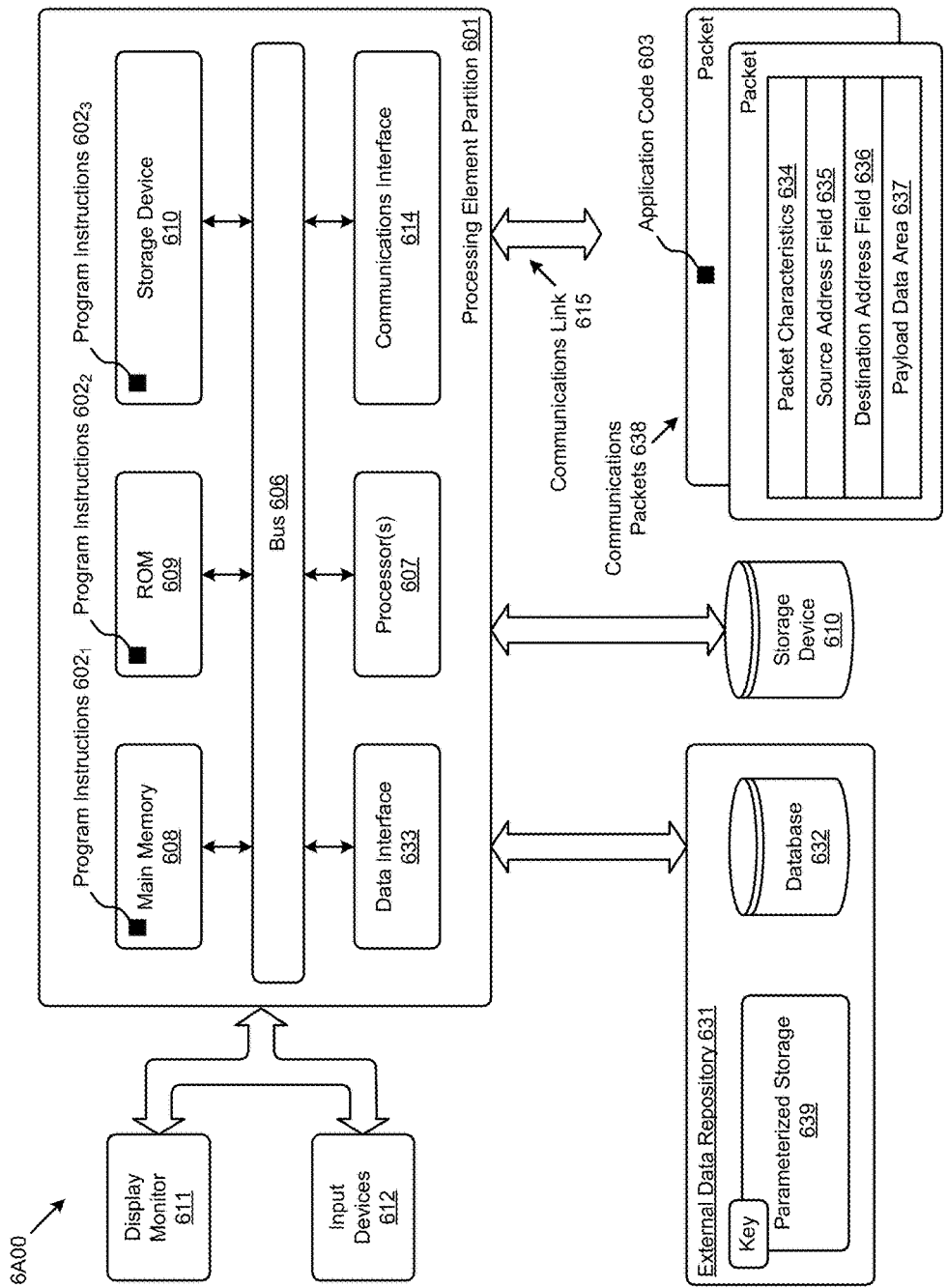
FIG. 6A and FIG. 6B depict exemplary architectures of components suitable for implementing embodiments of the present disclosure and/or for use in the herein-described environments.

FIG. 6A depicts a block diagram of an instance of a computer system 6A00 suitable for implementing embodiments of the present disclosure. Computer system 6A00 includes a bus 606 or other communication mechanism for communicating information. The bus interconnects subsystems and devices such as a central processing unit (CPU), or a multi-core CPU (e.g., having two or more data processors), a system memory (e.g., main memory 608, or an area of random access memory RAM), a non-volatile storage device or area (e.g., ROM 609), an internal or external storage device 610 (e.g., magnetic or optical), a data interface 633, a communications interface 614 (e.g., PHY, MAC, Ethernet interface, modem, etc.). The aforementioned components are shown within processing element partition 601, however other partitions are possible. The shown computer system 6A00 further comprises a display 611 (e.g., CRT or LCD), various input devices 612 (e.g., keyboard, cursor control), and an external data repository 631.

According to an embodiment of the disclosure, computer system 6A00 performs specific operations by processor 607 executing one or more sequences of one or more program code instructions contained in a memory. Such instructions (e.g., program instructions $602_1$, program instructions $602_2$, program instructions $602_3$, etc.) can be contained in or can be read into a storage location or memory from any computer readable/usable medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination therefrom.

According to an embodiment of the disclosure, computer system 6A00 performs specific networking operations using one or more instances of communications interface 614. Instances of the communications interface 614 may comprise one or more networking ports that are configurable (e.g., pertaining to speed, protocol, physical layer characteristics, media access characteristics, etc.) and any particular instance of the communications interface 614 or port thereto can be configured differently from any other particular instance. Portions of a communication protocol can be carried out in whole or in part by any instance of the communications interface 614, and data (e.g., packets, data structures, bit fields, etc.) can be positioned in storage locations within communications interface 614, or within system memory, and such data can be accessed (e.g., using random access addressing, or using direct memory access DMA, etc.) by devices such as processor 607.

The communications link 615 can be configured to transmit (e.g., send, receive, signal, etc.) communications packets 638 comprising any organization of data items. The data items can comprise a payload data area 637, a destination address 636 (e.g., a destination IP address), a source address 635 (e.g., a source IP address), and can include various encodings or formatting of bit fields to populate the shown packet characteristics 634. In some cases the packet characteristics include a version identifier, a packet or payload length, a traffic class, a flow label, etc. In some cases the payload data area 637 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to processor 607 for execution. Such a medium may take many forms including, but not limited to, non-volatile media and volatile media. Non-volatile media includes, for example, optical or magnetic disks such as disk drives or tape drives. Volatile media includes dynamic memory such as a random access memory.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of storage facility or external data repository 631, which in turn can be formatted into any one or more storage areas, and which can comprise parameterized storage 639 accessible by a key (e.g., filename, table name, block address, offset address, etc.).

Execution of the sequences of instructions to practice certain embodiments of the disclosure are performed by a single instance of the computer system 6A00. According to certain embodiments of the disclosure, two or more instances of computer system 6A00 coupled by a communications link 615 (e.g., LAN, PTSN, or wireless network) may perform the sequence of instructions required to practice embodiments of the disclosure using two or more instances of components of computer system 6A00.

The computer system 6A00 may transmit and receive messages such as data and/or instructions organized into a data structure (e.g., communications packets 638). The data structure can include program instructions (e.g., application code 603), communicated through communications link 615 and communications interface 614. Received program code may be executed by processor 607 as it is received and/or stored in the shown storage device or in or upon any other non-volatile storage for later execution. Computer system 6A00 may communicate through a data interface 633 to a database 632 on an external data repository 631. Data items in a database can be accessed using a primary key (e.g., a relational database primary key).

The processing element partition 601 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a processor 607. Some embodiments include one or more special-purpose hardware components (e.g., power control, logic, sensors, transducers, etc.). A module may include one or more state machines and/or combinational logic used to implement or facilitate performance characteristics of event-driven generation of watermarked shared objects.

Various implementations of the database 632 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of event-driven generation of watermarked thumbnails and watermarked previews of shared objects). Such files or records can be brought into and/or stored in volatile or non-volatile memory.

Figure 6B:
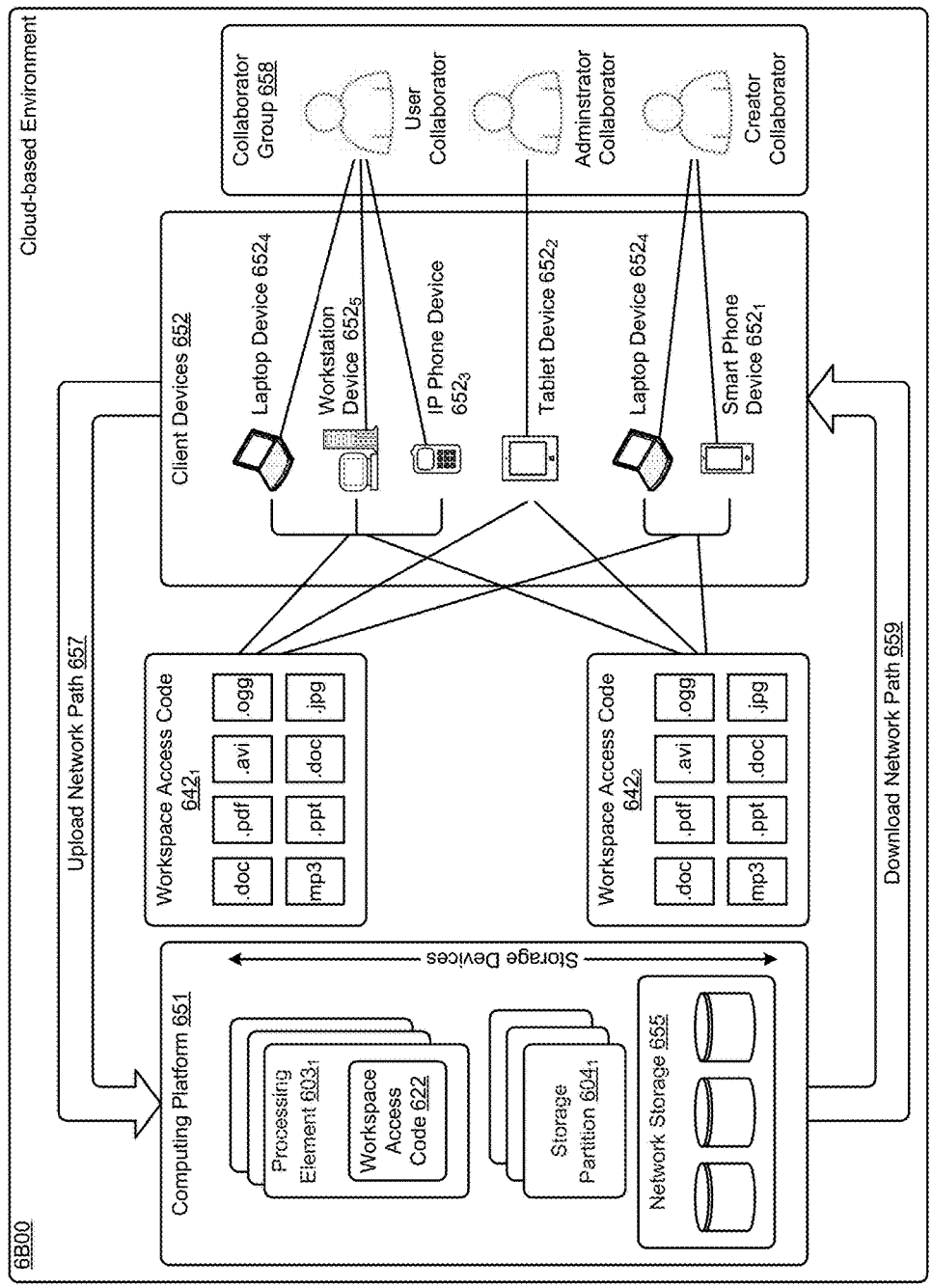

FIG. 6B depicts a block diagram of an instance of a cloud-based environment 6B00. Such a cloud-based environment supports access to workspaces through the execution of workspace access code 622 (e.g., workspace access code 642$_1$ and workspace access code 642$_2$. Workspace access code can be executed on any of the shown client devices 652 (e.g., laptop device 652$_4$, workstation device 652$_5$, IP phone device 652$_3$, tablet device 652$_2$, smart phone device 652$_1$, etc.). A group of users can form a collaborator group 658, and a collaborator group can be comprised of any types or roles of users. For example, and as shown, a collaborator group can comprise a user collaborator, an administrator collaborator, a creator collaborator, etc. Any user can use any one or more of the user devices, and such user devices can be operated concurrently to provide multiple concurrent sessions and/or other techniques to access workspaces through the workspace access code.

A portion of workspace access code can reside in and be executed on any user device. Also, a portion of the workspace access code can reside in and be executed on any computing platform 651, including in a middleware setting. As shown, a portion of the workspace access code resides in and can be executed on one or more processing elements (e.g., processing element 603$_1$). The workspace access code can interface with storage devices such the shown network storage 655. Storage of workspaces and/or any constituent files or objects, and/or any other code or scripts or data can be stored in any one or more storage partitions (e.g., storage partition 604$_1$). In some environments, a processing element includes forms of storage, such as RAM and/or ROM and/or FLASH, and/or other forms of volatile and non-volatile storage.

A stored workspace can be populated via an upload (e.g., an upload from client devices 652 to a processing element over an upload network path 657). A stored workspace can be delivered to a particular user and/or shared with other particular users via a download (e.g., a download from a processing element to a user device over a download network path 659).

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings to be regarded in an illustrative sense rather than in a restrictive sense.

What is claimed is:

1. A method for watermarking an editable document comprising:

configuring a server in a cloud-based environment, wherein one or more storage devices are accessible by the server to provide cloud-based storage services to two or more client entities as a service across a network;

maintaining an editable document at the server in a first version using a version indication, wherein the editable document is accessible from the server by a first client entity, wherein the first client entity edits the editable document live and a second client entity receives updated watermarked pages indicating a preview representation of the editable document as the updated watermarked pages are edited by the first client entity in an editing session of the editable document, wherein the editing session corresponds to the first client entity editing the first version of the editable document comprising a first watermark image and a preview session corresponds to a second client entity viewing the preview representation of the editable document comprising a second watermark image that is different from the first watermark, wherein the first version of the editable document is stored in a first storage location and the preview representation of the editable document is stored in a second storage location different from the first storage location;

applying the first watermark image to the first version of the editable document and granting edit access to the first version of the editable document to the first client entity of the two or more client entities;

generating the preview representation of the editable document that is different from the first version of the editable document while the first client entity has edit access to the first version of the editable document; and applying the second watermark image to the preview representation of the editable document by manipulating the preview representation of the editable document rather than manipulating the editable document before delivering the preview representation of the editable document to the second client entity of the two or more client entities.

2. The method of claim 1, wherein the second watermark image is different from the first watermark image.

3. The method of claim 1, wherein the preview representation corresponds to at least one of an icon, a live thumbnail or a preview copy of the editable document.

4. The method of claim 1, wherein the second watermark image is applied as at least one of a layer or a rasterized image.

5. The method of claim 1, wherein the-version indication comprises sending a notification to the two or more entities upon detection of a change to the editable document.

6. The method of claim 1, wherein the second watermark image comprises at least one of a visual representation of at least a portion of a credential or identifying aspect associated with the first client entity or a rasterized image of an email alias.

7. The method of claim 6, wherein the aspect associated with the first client entity is at least one of, a user identification, or a first timestamp, or a second timestamp, or a session status, or a session duration, or any combination thereof.

8. The method of claim 1, wherein the first client entity is embodied as a computer processor and the second client entity is a human user.

9. The method of claim 1, wherein the editable document is at least one of, a presentation document, or a spreadsheet document, or a formatted text document, or an image document, or a photo, or a portable document, of any combination thereof.

10. The method of claim 1, wherein the editable document is a video clip and the second watermark image is applied to a selection of frames of the video clip.

11. The method of claim 1, wherein maintaining the editable document further comprises detecting an edit to a page from the editable document and sending updated copies of the page to two or more client entities viewing the page.

12. The method of claim 1, further comprising retrieving at least one of a set of access permissions from a role profile, a set of user credentials or a folder name associated with the editable document.

13. The method of claim 12, further comprising, generating a watermark based at least in part on at least a portion of the role profile or intended purpose as indicated by a requesting collaborator.

14. The method of claim 12, further comprising, generating a watermark based at least in part on at least a portion of the set of user credentials.

15. The method of claim 14, further comprising determining a leak source based at least in part on the set of user credentials.

16. The method of claim 12, further comprising determining a leak source based at least in part on the folder name.

17. The method of claim 1, further comprising
receiving, by a previewer, a request to view a specific version of the editable document;
generating a preview of the specific version of the editable document;
storing the preview of the specific version of the editable document;
sending the preview of the specific version to a watermarking service, wherein the preview of the specific version is returned in a specific format that can be rendered on a user device of the previewer; and
translating the preview of the specific version to a PDF, wherein a watermark is injected into the PDF before being served for download to the previewer.

18. The method of claim 1, further comprising generating at least one of an icon, a thumbnail, or a live preview copy of the editable document that is downloadable.

19. A computer program product, embodied in a non-transitory computer readable medium, the non-transitory computer readable medium having stored thereon a sequence of instructions which, when stored in memory and executed by a processor causes the processor to execute a set of acts for watermarking an editable document, the set of acts comprising:
configuring a server in a cloud-based environment, wherein one or more storage devices are accessible by the server to provide cloud-based storage services to two or more client entities as a service across a network;
maintaining an editable document at the server in a first version using a version indication, wherein the editable document is accessible from the server by a first client entity, wherein the first client entity edits the editable document live and a second client entity receives updated watermarked pages indicating a preview representation of the editable document as the updated watermarked pages are edited by the first client entity in an editing session of the editable document, wherein the editing session corresponds to the first client entity editing the first version of the editable document comprising a first watermark image and a preview session corresponds to a second client entity viewing the preview representation of the editable document comprising a second watermark image that is different from the first watermark, wherein the first version of the editable document is stored in a first storage location and the preview representation of the editable document is stored in a second storage location different from the first storage location;
applying the first watermark image to the first version of the editable document and granting edit access to the first version of the editable document to the first client entity of the two or more client entities;
generating the preview representation of the editable document that is different from the first version of the editable document while the first client entity has edit access to the first version of the editable document; and
applying the second watermark image to the preview representation of the editable document by manipulating the preview representation of the editable document rather than manipulating the editable document before delivering the preview representation of the editable document to the second client entity of the two or more client entities.

20. The computer program product of claim 19, wherein the version indication comprises sending a notification to the two or more entities upon detection of a change to the editable document.

21. The computer program product of claim 19, wherein the first watermark image comprises a first confidentiality notice and the second watermark image comprises a second confidentiality notice.

22. The computer program product of claim 19, wherein the second watermark image is applied as a layer.

23. The computer program product of claim 19, wherein the second watermark image is applied as a rasterized image.

24. The computer program product of claim 19, wherein the second watermark image comprises a visual representation of at least a portion of a credential or identifying aspect associated with the first client entity.

25. The computer program product of claim 24, wherein the aspect associated with the first client entity is at least one of, a user identification, or a first timestamp, or a second timestamp, or a session status, or a session duration, or any combination thereof.

26. The computer program product of claim 19, wherein the first client entity is embodied as a computer processor and the second client entity is a human user.

27. The computer program product of claim 19, wherein the editable document is at least one of, a presentation document, or a spreadsheet document, or a formatted text document, or an image document, or a photo, or a portable document, of any combination thereof.

28. The computer program product of claim 19, wherein the editable document is a video clip and the second watermark image is applied to a selection of frames of the video clip.

29. A system for watermarking an editable document comprising:

at least one server in a cloud-based environment, configured such that one or more storage devices are accessible by the server to provide cloud-based storage services to two or more client entities as a service across a network;

a storage area accessible by the at least one server to maintaining an editable document at the server in a first version using a version indication, wherein the editable document is accessible from the server by a first client entity, wherein the first client entity edits the editable document live and a second client entity receives updated watermarked pages indicating a preview representation of the editable document as the updated watermarked pages are edited by the first client entity in an editing session of the editable document, wherein the editing session corresponds to the first client entity editing the first version of the editable document comprising a first watermark image and a preview session corresponds to a second client entity viewing the preview representation of the editable document comprising a second watermark image that is different from the first watermark, wherein the first version of the editable document is stored in a first storage location and the preview representation of the editable document is stored in a second storage location different from the first storage location;

a first module in a watermarking server to apply the first watermark image to the first version of the editable document and granting edit access to the first version of the editable document to the first client entity of the two or more client entities;

a collaboration server to generate the preview representation of the editable document that is different from the first version of the editable document while the first client entity has edit access to the first version of the editable document; and a second module in the watermarking server to apply the second watermark image to the preview representation of the editable document by manipulating the preview representation of the editable document rather than manipulating the editable document before delivering the preview representation of the editable document to the second client entity of the two or more client entities.

30. The system of claim 29, wherein the second watermark image is different from the first watermark image.

* * * * *